US012783516B2

(12) United States Patent
Yang et al.

(10) Patent No.: US 12,783,516 B2
(45) Date of Patent: Nov. 3, 2026

(54) METHOD, APPARATUS AND SYSTEM FOR CONFIGURABLE DATA COLLECTION FOR NETWORKED DATA ANALYTICS AND MANAGEMENT

(71) Applicant: HUAWEI TECHNOLOGIES CO., LTD., Shenzhen (CN)

(72) Inventors: Chenchen Yang, Guangdong (CN); Xu Li, Kanata (CA); Bidi Ying, Kanata (CA); Weisen Shi, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/886,327

(22) Filed: Sep. 16, 2024

(65) Prior Publication Data

US 2025/0013642 A1 Jan. 9, 2025

Related U.S. Application Data

(63) Continuation of application No. PCT/CN2022/093415, filed on May 18, 2022.

(51) Int. Cl.

| | |
|---|---|
| ***G06F 16/20*** | (2019.01) |
| ***G06F 16/2453*** | (2019.01) |
| ***G06F 16/903*** | (2019.01) |

(52) U.S. Cl.

CPC .. *G06F 16/24542* (2019.01); *G06F 16/90335* (2019.01)

(58) Field of Classification Search

CPC ..................... G06F 16/24542; G06F 16/90335
USPC ......................... 707/718, 720, 721, 731, 736
See application file for complete search history.

(56) References Cited

U.S. PATENT DOCUMENTS

| | | | | |
|---|---|---|---|---|
| 8,892,513 | B2 * | 11/2014 | Forsythe | G06F 16/90 707/613 |
| 10,817,530 | B2 * | 10/2020 | Siebel | G06F 8/10 |
| 10,824,634 | B2 * | 11/2020 | Siebel | G06F 8/10 |
| 11,954,112 | B2 * | 4/2024 | Siebel | G06F 8/35 |
| 2012/0222050 | A1 * | 8/2012 | Kidron | G06F 21/10 719/318 |

(Continued)

FOREIGN PATENT DOCUMENTS

| | | |
|---|---|---|
| CN | 105989523 A | 10/2016 |
| CN | 112567799 A1 | 3/2021 |

(Continued)

OTHER PUBLICATIONS

3GPP TS 23.288 V17.2.0 (Sep. 2021).
International Search Report and Written Opinion dated Nov. 30, 2022 for International Patent Application No. PCT/CN2022/093415.

*Primary Examiner* — Daniel A Kuddus

(57) ABSTRACT

A networked data analytics management (DAM) system includes a data representation manager (DRM), a data collection and preprocessor (DCP), a correlation manager (CM) and a data source discoverer (DSD). The DRM obtains representations of data sources, used to represent data source characteristic. The DCP interacts with the data sources to obtain data via data collection actions. The CM determines correlations between different obtainable data, based on the representations. The DSD interacts with a data consumer and the CM to determine the set of data collection actions to perform, and to configure the DCP.

20 Claims, 21 Drawing Sheets

(56) References Cited

U.S. PATENT DOCUMENTS

| | | | | |
|---|---|---|---|---|
| 2012/0259831 | A1* | 10/2012 | Wang | G06F 16/9535 707/738 |
| 2013/0110775 | A1* | 5/2013 | Forsythe | G06F 16/90 707/613 |
| 2017/0006135 | A1* | 1/2017 | Siebel | G06F 8/10 |
| 2017/0220943 | A1* | 8/2017 | Duncan | G06F 8/38 |
| 2019/0265971 | A1* | 8/2019 | Behzadi | G06F 8/10 |
| 2019/0394655 | A1* | 12/2019 | Rahman | H04L 41/142 |
| 2021/0037400 | A1* | 2/2021 | Yao | H04W 24/02 |
| 2021/0377156 | A1* | 12/2021 | Michael | H04L 41/122 |
| 2021/0377256 | A1* | 12/2021 | Nagano | G06F 3/1287 |

FOREIGN PATENT DOCUMENTS

| | | | |
|---|---|---|---|
| WO | WO2016026407 | * | 2/2016 |
| WO | WO2016026407 | A2 * | 2/2016 |
| WO | 2017142840 | A1 | 8/2017 |

* cited by examiner

451

455 456 457

| Correlated representations | Correlation type | Description |
|---|---|---|
| [(DS1, DS2); (R1, R4), (R3, R6); 0.86, 0.43] | Similarity | To correlate the data from data source #1 and from data source #2. |
| [(DS1, DS3); (R3, R8); 0.25) | Inclusion dependency | To correlate the data from data source #1 and from data source #3. |
| ... | ... | ... |

455a 456a 457a 455b 456b 457b

Figure 3B

METHOD, APPARATUS AND SYSTEM FOR CONFIGURABLE DATA COLLECTION FOR NETWORKED DATA ANALYTICS AND MANAGEMENT

CROSS-REFERENCE TO RELATED APPLICATIONS

This application is a continuation of International Patent Application No. PCT/CN2022/093415, filed May 18, 2022, entitled "Method, Apparatus and System for Configurable Data Collection for Networked Data Analytics and Management" the contents of which are incorporated herein by reference in its entirety.

TECHNICAL FIELD

The present invention pertains in general to the collection and analysis of data using an established data network, and in particular to supports for configurable data collection and analysis operations.

BACKGROUND

Networks, such as fifth generation (5G) networks as defined by the 3$^{rd}$ Generation Partnership Project (3GPP™), utilizing data analytics may include infrastructure devices (e.g. access points or base stations, core network devices, gateways, etc.) as well as client devices (e.g. mobile devices, user equipment (UE) devices, Internet of things (IoT) end devices, etc.).

Data analytics functions can be used by a network to provide a data service. Such a data service may include a data collection service, a data privacy protection service, a data analytics service and a data delivery service. The network can collect, via data analytics functions, data from data sources and deliver the collected data to data consumers. Data consumers can use the data to perform tasks such as data analytics, artificial intelligence (AI) training and AI inference.

It is expected that, particularly in future networks such as 6$^{th}$ Generation (6G) networks, a large number of data sources and data items may be scattered across the network. For example, in addition to the network functions (NFs), User Equipment (UEs), radio access networks (RANs), mobile edge computing (MEC) nodes, routers, and edge nodes, there may be other data sources. Such other data sources may involve vertical service providers such as IoT service providers and automatic driving service providers. These vertical service providers can be parts of network functions or a 3rd party. Each data source may possess datasets collected from its connected network devices (e.g. identified by device IDs, UE IDs, etc.). For example, each vertical service provider may possess its data (e.g. sensing data) collected from its subscribers. Data consumer may require the data from such data sources to perform tasks such as data analytics, AI training and AI inference.

In a future sixth generation (6G) network, data analytics functions may be intermediate network functions used to connect data sources and data consumers. Accordingly, data consumer and data source may be transparent to each other and each may not necessarily be aware of the existence of the other. However, existing proposals for implementing data analytics functions (e.g. in a future 6G network) are subject to improvement in various ways. For example, in large networks, existing implementations or strategies (e.g. as deployed in a 5G network) may be inefficient or even ineffective in their capability to collect data to support a specific task in a future 6G network, especially when a data consumer has limited information.

Therefore, there is a need for a method, apparatus and system for configurable data collection in a networked data analytics and management context, that obviates or mitigates one or more deficiencies of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide method, apparatus and system for configurable data collection in a networked data analytics and management (DAM) context. Embodiments may facilitate some or all of: automatic registration and organization of data sources, configurable task-specific data collection, data preprocessing, or both, automatic detection of correlations between different obtainable data, and interactive support for discovering appropriate data collection actions.

In accordance with an embodiment of the present disclosure, there is provided a networked computerized system including a data representation manager (DRM) module, a data collection and preprocessing (DCP) module, a correlation manager (CM) module, and a data source discovery (DSD) module. It is noted that, in other embodiments, one or more of the DRM module, the DCP module, the CM module, and the DSD module may be omitted. The DRM module is configured to obtain at least one representation of one or more data sources, each representation corresponding to a data source of said one or more data sources, and the representation used to represent a characteristic of said data source. The DCP module is configured to interact with members of the one or more data sources to obtain data therefrom in accordance with a set of data collection actions. The CM module is configured to determine at least one correlation between different data obtainable from said one or more data sources, said at least one correlation being based at least in part on said at least one representation. The DSD module is configured to: interact with a data consumer component and the CM module to determine the set of data collection actions to be performed in support of a request from the data consumer; and configure the DCP module to perform the set of data collection actions.

In accordance with an embodiment of the present disclosure, the set of data collection actions may include: collecting raw data from the one or more data sources; or collecting raw data from the one or more data sources and preprocessing the raw data collected from the one or more data sources.

In accordance with an embodiment of the present disclosure, preprocessing the raw data may include one or more of merging the raw data; filtering the raw data; cleaning the raw data; and normalizing the raw data.

In accordance with an embodiment of the present disclosure, said at least one representation may include one or more of: information indicative of said data source; and information indicative of data that said data source is capable of providing. The information indicative of said data source may include one or more of: data source type; an application category that data from said data source is usable for; a location of said data source; a service that can be provided by said data source; an ability of said data source;

and contextual information of said data source. The information indicative of data that said data source is capable of providing may include one or more of: metadata; a data name; a data title; a data tag; a key word; data semantics; a data attribute; a data feature; a data schema; a data format; and an application category that the data can be used for.

In accordance with an embodiment of the present disclosure, the DRM module may be configured to receive the at least one representation. The DRM module may be configured to generate said at least one representation at least in part by: requesting a report from said data source; and receiving and processing the report to obtain the at least one representation. Requesting the report from said data source may include transmitting representation configuration information to said data source, said representation configuration information indicating a representation of data to be provided by said data source to the DRM module.

In accordance with an embodiment of the present disclosure, the DRM module may be configured to receive data from said data source and process the received data into the at least one representation. The DRM module may be further configured to send the at least one representation and said received data from said one or more data sources to the CM module. The CM module may evaluate at least one correlation between parts of said received data by parsing said received data and the at least one representation.

In accordance with an embodiment of the present disclosure, at least one correlation between different data obtainable from said one or more data sources may be an indication of coherence between two or more members of said different data. Said coherence may reflect one or more of: a degree of equality or inequality; a degree of similarity or dissimilarity; a degree of inclusion dependency or exclusion dependency; and a degree of transitive correlation.

In accordance with an embodiment of the present disclosure, the DRM module may be configured to interact with the CM module to initiate the CM module to perform said determining at least one correlation between said different data obtainable from said one or more data sources. Said interacting with the CM module may include the DRM module sending an evaluation request to the CM module. The evaluation request may include one or more of: one or more of said at least one representation; a correlation type to be used in said determining at least one correlation; an indication that the CM module is to evaluate correlation information for the one or more of said at least one representation; an indication that the CM module is to perform said determining at least one correlation based on the correlation type; an application category identifier indicative of an application category that said at least one representation belong to, or indicative that the CM module is to determine at least one correlation between said at least one representation and the application category, or a combination thereof; a data source identifier identifying one or more members of the one or more data sources which are providing an associated one or more of said at least one representation; and one or more computer memory addresses holding raw data of one or more of said at least one representation. Said interacting with the data consumer component may include generating a query plan indicative of data to be collected and members of the one or more data sources from which said data is to be collected.

In accordance with an embodiment of the present disclosure, configuring the DCP module to perform the set of data collection actions may include selecting, based on the set of data collection actions, one or more of a plurality of DCP module instances, and configuring said selected one or more of the plurality of DCP module instances. The DCP module may be configured to provide results of said set of data collection actions to the data consumer.

In accordance with an embodiment of the present disclosure, the DSD module interacting with the data consumer component may include receiving and processing contents of the request from the data consumer component. The contents of the request from the data consumer component may include parameters indicative of one or more of: an application category identifier indicative of a category that results of the data collection actions are to be used for; an indication of one or more features of data required by the data consumer; a number of correlated datasets required by the data consumer; an indication of dependencies of datasets required by multiple parties and indicating a required correlation between the datasets required by multiple parties; an address of a device of the data consumer which is designated to receive results of the set of data collection actions; and one or more final target data requirements for results of the set of data collection actions to be transmitted to the data consumer. The networked computerized system may be further configured to perform said configuring of the DCP module to perform the set of data collection actions based at least in part on said parameters that may be included in the request from the data consumer component.

In accordance with an embodiment of the present disclosure, the DCP module may include a DCP controller and a plurality of DCP point devices. The DCP point devices may be responsive to configuration instructions by the DCP controller. The configuration instructions may cause the DCP point devices to collectively perform the set of data collection actions. The DCP controller may be deployed in a control plane of a network, and the DCP point devices may be deployed in a user plane or a data plane of the network. One of the DCP point devices may be configured, due to said configuring of the DCP module, to operate as an anchor device operative to provide results of said set of data collection actions to one or more devices of the data consumer. The DCP controller may be configured to perform one or more of: determining or optimizing one or more rules for preprocessing said obtained data; selecting ones of the DCP point devices to perform the set of data collection actions; configuring and activating ones of the DCP point devices; and optimizing resource scheduling in support of performing the set of data collection actions. The DCP controller may be configured to send, to at least one of the DCP point devices, a data collection and preprocessing requirement message, the data collection and preprocessing requirement message causing said at least one of the DCP point devices to perform one or more data collection tasks, data preprocessing tasks, or both, said tasks configured based on contents of the data collection and preprocessing requirement message. Parameters of the data collection and preprocessing and requirement message may include one or more of: an identifier of one of the DCP point devices to be configured and activated; an indication of whether or not data preprocessing is required; a data query statement indicating types of raw data to be collected from specified ones of the set of networked data sources; an address of a device to which said at least one of the DCP point devices is to forward output toward; a requirement on final target data to be transmitted to the data consumer; and a data preprocessing rule indicating how collected raw data is to be preprocessed.

In accordance with an embodiment of the present disclosure, the DCP module may include one or more devices each configured to provide an indication of capabilities thereof to the DSD module, the DSD module performing said configuring the DCP module based in part on said indication of capabilities.

In accordance with an embodiment of the present disclosure, the DSD module interacting with the CM module may include sending a correlation information request to the CM module, the correlation information request specifying one or more types of correlations and the correlation information request being a request for the CM module to identify correlations, of said specified one or more types, between members of said different data obtainable from said set of networked data sources. The correlation information request may include one or more parameters for specifying required correlation information, including one or more of: an application category identifier indicating an application which the required correlation information is to be related to; one of the representations of data sources which the required correlation information is related to; and a correlation type which the required correlation information is related to.

In accordance with an embodiment of the present disclosure, configuring the DCP module to perform the set of data collection actions may include the DSD module providing the DCP module with one or more configuration parameters including one or more of: an identifier of a DCP point device to be configured and activated; an indication of whether preprocessing on said obtained data is to be performed; an indication of raw data to be collect from specified members of the set of networked data sources; an address of a device to which the DCP module is to forward output toward; an indication of a requirement on final target data to be transmitted to the data consumer; an indication of one or more rules to be applied by said preprocessing on said obtained data; and an indication of one or more data correlations between different involved ones of said representation of data sources, said indication being used in said preprocessing on said obtained data. The indication of one or more rules to be applied by said preprocessing on said obtained data may be indicative of one or more of: one or more rules to be used for merging said obtained data; one or more rules to be used for filtering said obtained data; one or more rules to be used for cleaning said obtained data, normalizing said obtained data, or both; one or more indications of portions of said obtained data to which associated ones of the one or more rules are to be applied; and one or more conditions triggering implementation of associated ones of the one or more rules.

In accordance with an embodiment of the present disclosure, there is provided a data representation manager (DRM) networked computerized device configured to: obtain at least one representation of one or more data sources, each representation corresponding to a respective data source of one or more data sources, the representation used to represent a characteristic of said data source; and interact with one or more other devices to support determining of correlations between different data obtainable from said one or more data sources, said correlations being based at least in part on said at least one representation of data sources. In such embodiments, the DRM device may be configured in one or more ways as already described above with respect to the DRM module of the networked computerized system.

In accordance with an embodiment of the present disclosure, there is provided a data collection and preprocessing (DCP) networked computerized device configured to: interact with one or more other devices to configure the DCP device to perform a set of data collection actions; and interact with members of a set of one or more data sources to obtain data therefrom, in accordance with the set of data collection actions. The DCP module may be further configured to perform preprocessing on said obtained data in accordance with the set of data collection actions. In such embodiments, the DCP device may be configured in one or more ways as already described above with respect to the DCP module of the networked computerized system.

In accordance with an embodiment of the present disclosure, there is provided a correlation manager (CM) networked computerized device configured to: determine at least one correlation between different data obtainable from a set of networked data sources, said at least one correlation being based at least in part on at least one obtained representation of data sources belonging to the set of networked data sources; and interact with one or more other devices to determine a set of data collection actions to be performed in support of a request from a data consumer. In such embodiments, the CM device may be configured in one or more ways as already described above with respect to the CM module of the networked computerized system.

In accordance with an embodiment of the present disclosure, there is provided a data source discovery (DSD) networked computerized device configured to: interact with a data consumer component and one or more other devices to determine a set of data collection actions to be performed in support of a request from a data consumer; and configure a further device to perform the set of data collection actions. In such embodiments, the DSD device may be configured in one or more ways as already described above with respect to the DSD module of the networked computerized system.

In accordance with an embodiment of the present disclosure, there is provided a method of data management. The method may include obtaining, by a data management module, at least one representation of one or more data sources, each representation corresponding to a data source of said one or more data sources, the representation used to represent a characteristic of said data source; receiving, by the data management module, a request from a data consumer, the request used to request data; and determining, by the data management module, said data requested by the data consumer according to the request information and the at least one representation. Determining the data requested by the data consumer according to the request information and the at least one representation may include: collecting raw data from the one or more data sources according to the request information and the at least one representation; or collecting raw data from the one or more data sources and preprocessing the raw data collected from the one or more data sources according to the request information and the at least one representation. The method may include: determining one or more rules for preprocessing the raw data; or determining resource scheduling in support of performing the collecting raw data or the preprocessing raw data. The one or more rules may include at least one of: one or more rules to be used for merging the raw data; one or more rules to be used for filtering the raw data; one or more rules to be used for cleaning the raw data; one or more rules to be used for normalizing the raw data; one or more indications of portions of the raw data to which associated ones of the one or more rules are to be applied; and one or more conditions triggering implementation of associated ones of the one or more rules.

In various embodiments, the method may omit one or more actions. For example, a method can be provided which performs actions associated herein with only one of: a DRM module or device, a DCP module or device, a CM module or device, and a DSD module or device. As another example, a method can be provided which performs actions associated herein with two or more of such modules or devices.

In accordance with an embodiment of the present disclosure, said obtaining, by the data management module, at least one representation of one or more data sources may include: requesting a report from said data source; and receiving and processing the report to obtain the at least one representation. Requesting the report may include transmitting representation configuration information to said data source, said representation configuration information indicating a representation of data to be provided by said data source to the data management module.

In accordance with an embodiment of the present disclosure, said obtaining, by the data management module, at least one representation of one or more data sources may include receiving data from said data source and processing the received data into the at least one representation. The data management module may determine at least one correlation between parts of said received data by parsing said received data from said one or more data sources together with the at least one representation.

In accordance with an embodiment of the present disclosure, said obtaining, by the data management module, at least one representation of one or more data sources may include receiving, by the data management module, the at least one representation of one or more data sources.

In accordance with an embodiment of the present disclosure, the method of data management may include determining, by the data management module, at least one correlation between different data obtainable from said one or more data sources, said at least one correlation being based at least in part on said at least one representations of data sources. Said determining, by the data management module, the data requested by the data consumer according to the request and the at least one representation may include determining, by the data management module, the data requested by the data consumer according to the request, the at least one representation and the at least one correlation.

In accordance with an embodiment of the present disclosure, said determining, by the data management module, the data requested by the data consumer according to the request and the at least one representation may include: generating, by the data management module, a query plan indicative of data to be collected and members of the one or more data source from which said data is to be collected; and determining, by the data management module, the data requested by the data consumer according to said query plan.

In accordance with an embodiment of the present disclosure, the method of data management may include providing, by the data management module, the data requested by the data consumer to the data consumer.

In accordance with an embodiment of the present disclosure, the request from the data consumer may include parameters indicative of one or more of: an application category identifier indicative of a category that results of the data collection actions are to be used for; an indication of one or more features of data required by the data consumer; a number of correlated datasets required by the data consumer; an indication of dependencies of datasets required by multiple parties and indicating a required correlation between the datasets required by multiple parties; an address of a device of the data consumer which is designated to receive results of the set of data collection actions; and one or more final target data requirements for results of the set of data collection actions to be transmitted to the data consumer.

Embodiments have been described above in conjunction with aspects of the present invention upon which they can be implemented. Those skilled in the art will appreciate that embodiments may be implemented in conjunction with the aspect with which they are described but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE DRAWINGS

Further features and advantages of the present disclosure will become apparent from the following detailed description, taken in combination with the appended drawings, in which:

FIG. 3B illustrates example contents of a correlation library, according to embodiments of the present disclosure.

It will be noted that throughout the appended drawings, like features are identified by like reference numerals.

DETAILED DESCRIPTION

Embodiments of the present disclosure provide for one, some or all of: representation of (e.g. networked) data sources; configurable data collection and data preprocessing; resources for detecting and recording or tracking correlations between different obtainable data; and resources for interactively determining and implementing data collection actions in support of data consumer requirements. Embodiments may be integrated, as a networked computerized system, into a network such as a 5G or 6G data and/or communication network, so that operations are performed by components of the network itself.

Embodiments of the present disclosure may serve to alleviate potential problems with data analytics implementations. For example, in certain implementations in contrast with embodiments of the present disclosure, a data consumer may be assumed to know exactly what data is required for a specific task. The data consumer would then be expected to send a data request (e.g. via subscription) to the network with accurate indications (e.g. device IDs, SUPI IDs, cell IDs, PDU session IDs, network slice IDs) to direct collection of data from the data source(s). However, it is recognized herein that that data consumers might not know, with high accuracy, what data is required and the identity of relevant data sources for a specific task (e.g. AI training). When such a data consumer requests the data analytics operations system to collect data from data sources, only limited indication information (e.g. fuzzy data features) indicative of the required data might be available. It is challenging, complex and resource-consuming to fully express and address the data consumer's requirements based on such limited information.

Another potential problem with conventional data analytics implementations, which may be addressed by embodiments of the present disclosure, is that there may be a large number of available data sources (to provide data or to be participants) for a task serving the data consumer. If all of this large amount of available data is exposed to the data consumer, it may increase data collection and delivery overhead. Furthermore, even if this large amount of data were provided to the data consumer, it may tend to increase the data consumer's processing overhead. Therefore, in some (but not necessarily all) embodiments of the present disclosure, data collection may be limited to collecting a limited amount of (e.g. most suitable) data, data processing may be performed prior to delivery to the data consumer, or both. Accordingly, a set of data collection actions may be configured, to only retrieve specific data in support of a data consumer request.

Figure 1A:
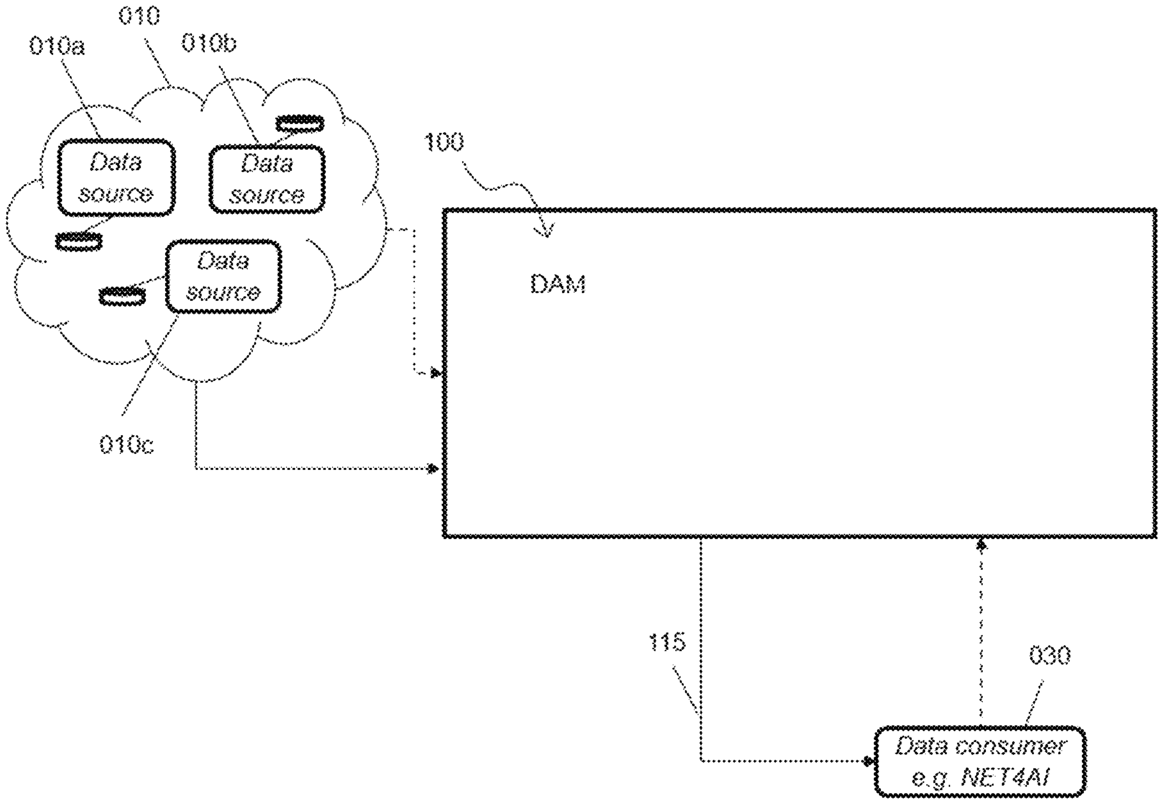
FIG. 1A illustrates operation of a DAM, according to embodiments of the present disclosure.

FIG. 1A illustrates operation of a data analytics and management (DAM) 100, according to embodiments of the present disclosure. The DAM 100 performs data collection actions on (e.g. collects selected data from) a (set of) data source 010 and provides results 115 of the data collection actions (e.g. provides the collected data or a result of processing the collected data) to a data consumer 030. The DAM 100 may collect data and provide results in response to a query made by the data consumer 030 (or another associated party) or generated by the DAM with participation of the data customer. Throughout the present disclosure, the DAM may also be referred to as a data management module. Various actions of components of the DAM (e.g. modules) as described herein can be viewed as actions of the DAM itself.

In various embodiments, the DAM supports data discovery and configurable data collection operations. This support may involve intelligently and interactively assisting a data consumer to select the suitable data sources and data items, by interacting with the data consumer. This assistance may be provided even when only limited indication information (e.g. fuzzy data features) is provided to the DAM by the data consumer. The data consumer may be a human user or an automated computing device, for example.

In various embodiments, the DAM supports data preprocessing. Preprocessing may be performed on obtained data when necessary, but is not necessarily performed in all scenarios. Preprocessing may be performed for example when the raw data as obtained by the DAM is not directly useable by the data consumer (component), or when the raw data includes contents which are not relevant to the data consumer's requirements (also referred to herein as "useless" or "non-relevant" data), or when the raw data includes redundancy which can be removed. For example, a data consumer may require a composite dataset (which is not available from any single data source). In such a case, the DAM may be configured to create the composite dataset based on (e.g. by merging or stitching together) data from different data sources.

It is also considered that raw data obtained from a data source may contain useless, non-relevant data, redundant data or non-directly useable data. Further, data from two data sources may be partially redundant. Accordingly, in various embodiments, the DAM may be configured to preprocess raw data and then provide results of the preprocessing (or more generally, results of data collection actions) to a data consumer. For example, different structures of datasets may be needed to support different tasks of a data consumer. Accordingly, raw data may be preprocessed into a required data structure.

It is considered that different data consumers (or multiple parties of a single data consumer) are not necessarily independent. The datasets the different consumers require may be correlated (e.g. on ID and feature alignment) and potentially interdependent. Accordingly, in various embodiments the DAM may be configured to select and prepare data for such multiple datasets together rather than select and prepare data for each of the datasets separately. This can assist with meeting a requirement of data correlations among multiple consumers (or multiple parties of a consumer). Thus, a required correlation between different data sets can be provided for.

It is also considered that, given the data needed by different data consumers (or multiple parties of a consumer) may be correlated, the DAM may be configured to maintain e.g. determine, record or track) the correlations between different data. The DAM may be configured to use this correlation information to facilitate choosing suitable data to be provided to each of the multiple data consumers (or multiple parties of a consumer). Moreover, some data may be related to specific services, applications or usages. In such scenarios, the DAM may be configured to maintain (e.g. determine, record or track) correlations between data and services, applications, usages, or combinations thereof. The DAM can then use this information to support selecting suitable data to provide to data consumers.

In various embodiments, to correlate the data from a data source, the DAM may be configured to provide functions which obtain (e.g. capture and maintain) information regarding one or more of the data sources. This information can include information regarding what data can be provided by the data sources (i.e. data which the data sources are capable of providing), for example. There may be a variety of data sources (e.g. NFs, RANs, UEs, network sensors, vertical service providers). Furthermore, such data sources may dynamically register to and leave a network. Therefore, in embodiments of the present disclosure, the DAM is configured to capture, track and maintain information regarding the data sources, so that data discovery, collection and selection can be done by the DAM in an orderly manner based on the data source information.

According to embodiments of the present disclosure, a DAM is configured to provide one or more modules to implement the foregoing functions. One or more of the foregoing functions may be implemented by one or more modules. A correspondence between a function and a module is not limited in this application. As an example, a data representation manager (DRM) module to manage data source information (especially what data the data source can provide), and a correlation manager (CM) module to determine (e.g. capture, detect and maintain) data correlation information. Data correlation information may include information regarding correlations between data, correlations between data and specific service/application/usage, etc. Data correlation information may include information regarding obtainable data (e.g. which has not yet been obtained), where the data correlation information is based for example on the data source information. Based on the data source information and correlation information, the DAM may be configured to discover and select suitable (e.g. most suitable) data to provide to a data consumer. Then the DAM may collect the useful data from data sources, optionally preprocess the data (e.g. via data filtering, data stitching, data cleaning, etc.) and deliver the preprocessed data to the data consumer.

As used herein, the term “module” or “device” may refer to a computerized device, or functional aspect thereof, which may be provided using a networked computing device, whether dedicated or virtualized. A module may be a network function, for example. Modules may operate together with other modules to provide an overall system of networked computerized (e.g. electronic) devices.

Accordingly, embodiments of the present disclosure pertain to a method, system and apparatus to facilitate data discovery and preprocessing, in order to intelligently assist a data consumer to select and prepare suitable data for use.

Current 5G networks dedicated to providing communication service include a network repository function (NRF) to manage what kinds of services can be provided by network functions (NFs). For example, NFs register to NRF, and NRF maintains information regarding kinds of service can be provided by NFs. According to embodiments of the present disclosure, a network providing data (e.g. for AI tasks) may include the DRM module configured to manage what kinds of data can be provided by the data sources (e.g. NFs, UEs, RANs, MECs, database, vertical service providers). For example, Data sources may register to the DRM, and the DRM may maintain information regarding what kinds of data can be provided by data sources. The DRM may be configured to obtain information (e.g. data name, data title, metadata, key word, data attribute, data feature, application category) indicative of the data which can be provided by each of one or more data sources.

According to embodiments of the present disclosure, for example to support providing data for AI tasks, factors such as data attributes and data features may be used as a basis for correlating the data from multiple data sources. According to embodiments, the CM module is configured to manage such data correlations. The correlations may be evaluated by the CM considering various factors (e.g. data attributes) in addition or alternatively to identifiers associated with the data. Such identifiers (IDs) may include SUPI, UE IP, PDU session ID managed by NF UDM and AUSF, etc.

In various embodiments, it is considered that a data consumer does not necessarily know, or is in fact prohibited from knowing, the exact identities of data sources which may provide appropriate data. Accordingly, embodiments of the present disclosure are configured to assist data consumers in discovering and selecting suitable data (for a given task) from potentially large amounts of available data items and from potentially large numbers of data sources. Accordingly, a data source discovery (DSD) module is provided to interactively facilitate discovery of suitable data (and corresponding data collection actions). This discovery may be performed with the joint consideration of data consumers' requirement, data correlation information, data access overhead, etc. The DSD module may be configured to generate data query statements indicating the data to be collected and the data source to collect the data from. That is, the DSD module may configure other devices, such as the Data Collection and Preprocessing (DCP) module, to perform a set of data collection actions, which has been determined by the DSD module to support a request from the data consumer.

It is considered that raw data from data sources may not be directly or immediately usable, and may contain irrelevant (with respect to a given request) or redundant data. In 5G networks dedicated to providing communication service, the session management function (SMF) is used to select user plane function (UPF) instance, and configure communication rules to UPF for communication data transmission. The UPF executes the transmission of communication data based on the communication rules, under the control of SMF. According to embodiments of the present disclosure, for example to support providing data for AI tasks, a module or functionality is provided to select data preprocessing instances, construct data preprocessing rules for one or more of the instances, and configure the data preprocessing rules. A data preprocessing instance may execute data preprocessing tasks, under the control of DSD module. The DSD module may construct the data preprocessing rules (e.g. rules to modify and clean non-directly usable data, filter and delete irrelevant or redundant data) so as to indicate how collected raw data is to be preprocessed into target final data, for example as required by the data consumer.

The DCP module may be configured to execute data pre-processing (e.g., merge, stitch, filter or clean data, or a combination thereof), under the control or direction of the DSD module. Furthermore, the DSD module may select one or more of several instances of the DCP module, and configure these instances of the DCP module to perform operations according to specified data preprocessing rules.

Accordingly, in various embodiments of the present disclosure, the DSD module may assist a data consumer to discover and select suitable data (e.g. correlated datasets) with the joint consideration of the data consumers' requirement and data correlation information. The CM function may evaluate and maintain data correlation information (e.g. to maintain a data correlation library), and deliver the data correlation information to DSD for use. Information on data may be captured by DRM module. The DRM module may deliver the captured information on data to the CM module for correlation evaluation. Besides the ability of data discovery, DSD function may the ability to construct data preprocessing rules indicating how the collected raw data (e.g. non-directly usable, irrelevant or redundant data) is to be preprocessed into the final target data required by the data consumer. The DSD module may configure the data preprocessing rule to DCP which executes data preprocessing.

Figure 1B:
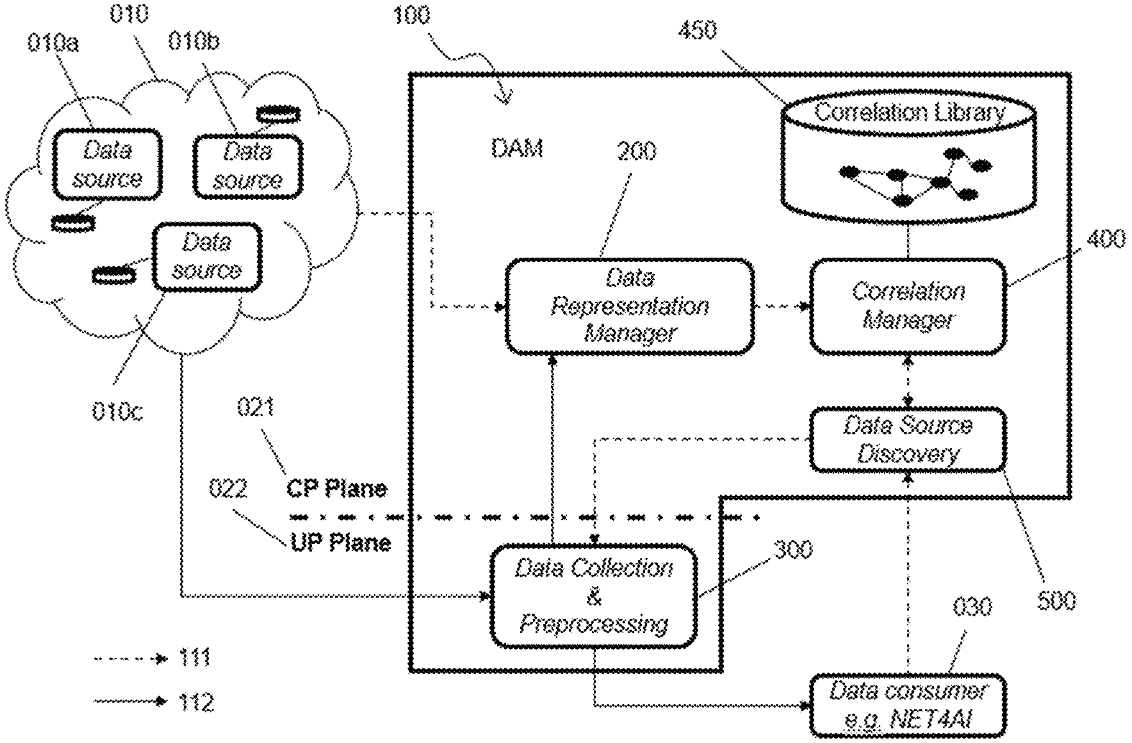
FIG. 1B illustrates details of a networked computerized DAM system, according to embodiments of the present disclosure.

FIG. 1B illustrates a networked computerized DAM system 100 according to embodiments of the present disclosure. The system as illustrated can be used to support at least data discovery, data collection, and data preprocessing. The system can include multiple modules, which may be provided using one or more real or virtual networked computing devices. The system as illustrated includes a DRM module 200, a DCP module 300, a CM module 400, and a DSD module 500. It should be noted that modules included in the DAM system in FIG. 1B are merely examples, and a function of each module described below may also be implemented by one or more other modules. As an example, the functions of the DRM module 200 and DCP module 300 can be implemented by other one module instead or can be implemented by other more modules instead.

The DRM module 200 is configured to obtain a representation of data sources belonging to a set 010 of (e.g. networked) data sources, e.g. 010*a*, 010*b*, 010*c*. At least one representation is obtained, and each representation corresponds to a particular data source. The representation of a data source can be used to represent one or more characteristics of the data source. Characteristics can correspond to information indicative of data which can be provided by the data sources, or other information regarding the data or the data source itself. For example, the information can include indications of data collection capabilities.

In various embodiments, the representation of a given data source can include characteristics such as information indicative of the given data source itself (data source parameters), information indicative of data that the given data source is capable of providing (data parameters), or both. Such information indicative of the given data source may include one or more data source parameters, non-limiting examples of which are described below.

The data source parameters may include data source type. The data source type may include one or more of: a UE, a NF, a RAN node, a vertical service provider, a 3rd party, a mobile edge computing (MEC) node, a router, and an edge node.

The data source parameters may include an application category (e.g. application category ID) that data from the given data source is usable for. The application category may indicate a purpose the data from the given data source can be used for, which may be one or more of: federated learning, AI training, federated AI inference, network resource management, UE mobility management, network operation and management, network policy management, network access management, slice management, session management, enhanced mobile broadband (eMBB) service, ultra-reliable low latency communications (URLLC) service, Massive Machine-Type Communications (mMTC) service, vertical service, vehicle service, and sensing service.

The data source parameters may include a location of the given data source, which may include one or more of: a cell or a tracking area the data source is located in, a network the data source belongs to, and the data source's geographical location.

The data source parameters may include a service that can be provided by the given data source, which may include one or more of: a raw data sharing service, and a raw data privacy protection service where the data source can be alone or can cooperate with a network to protect the privacy included in or inferred from the raw data.

The data source parameters may include an ability of the given data source. The ability of the given data source may be one or more of: an energy which can be used to report the data to be collected, a maximum transmit power which can be used to report the data to be collected, a maximum activate time of the data source, a quality of data that the data source can provide, an amount of data that the data source can provide.

The data source parameters may include contextual information of the given data source.

The information indicative of data that the given data source is capable of providing may include one or more data parameters, non-limiting examples of which are described below.

The data parameters may include metadata. Metadata may provide information about the data obtainable from the given data source. Metadata may describe one or more of: the source, size, format, abstract, overview, and other characteristics of the data. Metadata contributes to providing information on the content of a data or dataset.

The data parameters may include a data name. The data name may be one or more of: a string of the data, an index of the data, Hash of the data (e.g. Hash code, root of hash), and may be indicated with a Named Data Networking (NDN) scheme, an information centric networking (ICN) scheme, or other schemes.

The data parameters may include a data title. The data title may be one or more of: a string of the data, an index of the data, Hash of the data (e.g. Hash code, root of hash), and may be indicated with a Named Data Networking (NDN) scheme, an information centric networking (ICN) scheme, or other schemes.

The data parameters may include a data tag. The data tag may be one or more of: a string of the data, an index of the data, Hash of the data (e.g. Hash code, root of hash), and may be indicated with a Named Data Networking (NDN) scheme, an information centric networking (ICN) scheme, or other schemes.

The data parameters may include a key word, which may, for example, be a specific word abstracted from the data.

The data parameters may include data semantics, which may, for example, be a sentence or a paragraph which describes the data.

The data parameters may include a data attribute. For example, in the relational database which organizes data into one or more table of columns and rows, the column of the table may be a data attribute representing values attributed to an object.

The data parameters may include a data feature. The data feature may be abstracted from the data. The data feature may correspond to a feature used to describe the input data of an AI model in AI training or AI inference procedure. The data feature can be obtained from the data via one or more of: embedding, feature engineering, and represented learning method.

The data parameters may include a data schema, which may be a statistical distribution of data and/or a diagram of the data.

The data parameters may include a data format. The data format may be a normalized or standardized data structure of video (e.g. avi, flv), audio (e.g. MPEG-4, MIDI), image (e.g. jpg, png), database, and text.

The data parameters may include an application category that the data can be used for. Application category can also be referred to as service category or usage category. The application category may indicate a purpose the data from the given data source can be used for, which may be one or more of: federated learning, AI training, federated AI inference, network resource management, UE mobility management, network operation and management, network policy management, network access management, slice management, session management, enhanced mobile broadband (eMBB) service, ultra-reliable low latency communications (URLLC) service, Massive Machine-Type Communications (mMTC) service, vertical service, vehicle service, and sensing service.

Thus, the DRM module may act as a repository for information regarding available data sources, the data they can provide, and related details.

The data collection and preprocessing (DCP) module 300 is configured to collect data from data sources and deliver data to the data consumer. Thus, the DCP module interacts with data sources to obtain data therefrom in accordance with data collection actions. The DCP module 300 may further be configured, when required, to execute data preprocessing. The data collection, preprocessing and delivery actions may be configured in response to instructions provided by the DSD module 500. The DCP module 300 may be configured to deliver collected or processed data to the data consumer 030.

For further certainty, as used herein, data collection actions can include actions such as: collecting raw data from data sources; and collecting raw data from data sources and preprocessing the collected raw data. The preprocessing can include tasks such as merging, filtering, cleaning and normalizing raw data. Such tasks may be performed on raw data as collected or on data resulting from other preprocessing actions.

The CM module 400 is configured to determine (e.g. detect and maintain or track) at least one correlation between different data obtainable from the set of data sources. The correlations can be maintained in a correlation library 450, database, or other data structure. The correlations are based at least in part on the representations of data sources as provided by the DRM module 200.

The DSD module 500 is configured to interact with a data consumer component 030 and the CM module 400 to determine the set of data collection actions to be performed in support of a request from the data consumer. The DSD module 500 is further configured to configure the DCP module 300 to perform a specified set of data collection actions. The DSD module 500 may select an appropriate or best set of data sources from the set 010 for use in performing the determined set of data collection actions. Such selection may be made with the joint consideration of the data correlation information, data access overhead, and data consumer's requirement.

The DSD module 500 may be further configured to perform data query statement generation, for example as part of or following determining the set of data collection actions. Such a query statement may be generated to indicate the raw data to be collected and the data sources to collect such raw data from. The DSD module 500 may further trigger a data query request to the DCP module 300.

In various embodiments, the DSD module 500 may further determine data collection and preprocessing rules for implementation by the DCP module 300. This determination may be performed in order to indicate how the final target data is to be obtained from raw data. For example, preprocessing rules may be determined for modifying and cleaning non-directly useable data, filtering irrelevant or redundant data, or a combination thereof.

The DSD module 500 may further be configured to select instances of DCP module(s) or components (e.g. point(s) or instance(s)) thereof to be used to perform data collection and preprocessing. Such selection may be based for example on access overhead, data consumer mobility, communication link states, DCP ability, or the like, or a combination thereof.

Access overhead may relate to the DSD selecting one or more DCP module components located nearest to the data source and/or the data consumer so that the data access overhead (e.g. data collection and/or data delivery overhead) can be potentially reduced.

Data consumer mobility may relate to the DSD selecting one or more DCP module components whose coverage can include areas where the data consumer is typically located (e.g. moveably or stationarily), potentially contributing to the DCP module's or data consumer's switch and handover.

Communication link state may relate to the DSD selecting one or more DCP module components that have established a communication link with the data source or the data consumer, so that the link setup delay and overhead can be potentially reduced. Additionally or alternatively, the DSD module may select one or more DCP module components that have a better (e.g. more reliable, more stable, stronger signal, etc.) communication link with the data source or the data consumer, which may result in higher link transmission speed.

DCP ability may relate to the DSD selecting one or more DCP module components that have the corresponding preprocessing ability to preprocess the raw data. Additionally or alternatively, the DSD may select one or more DCP module components that have sufficient ability (e.g. enough computing resources, lower load, etc.) to execute the one or more data collection and (if needed) preprocessing tasks.

Once selected, the DSD module 500 may configure and activate the DCP module 300 or selected instances or components thereof, in accordance with the determined data collection and preprocessing rules.

The above-described modules may be deployed into different network layers flexibly. For example, the DRM module 200, CM module 400 and DSD module 500, and at least a DCP controller portion of the DCP module 300 may be deployed into but not limited to the control plane (CP) 021. DCP point device portions of the DCP module 300 may be deployed into but not limited to user plane (UP) 022 or data plane. The DRM, CM, DSD and DCP modules can be deployed on a user equipment (UE) side, a network side, or as part of a network function (NF), or with a 3rd party. The network side may include a radio access network (RAN) node or a core network (CN) function, for example.

Figure 2A:
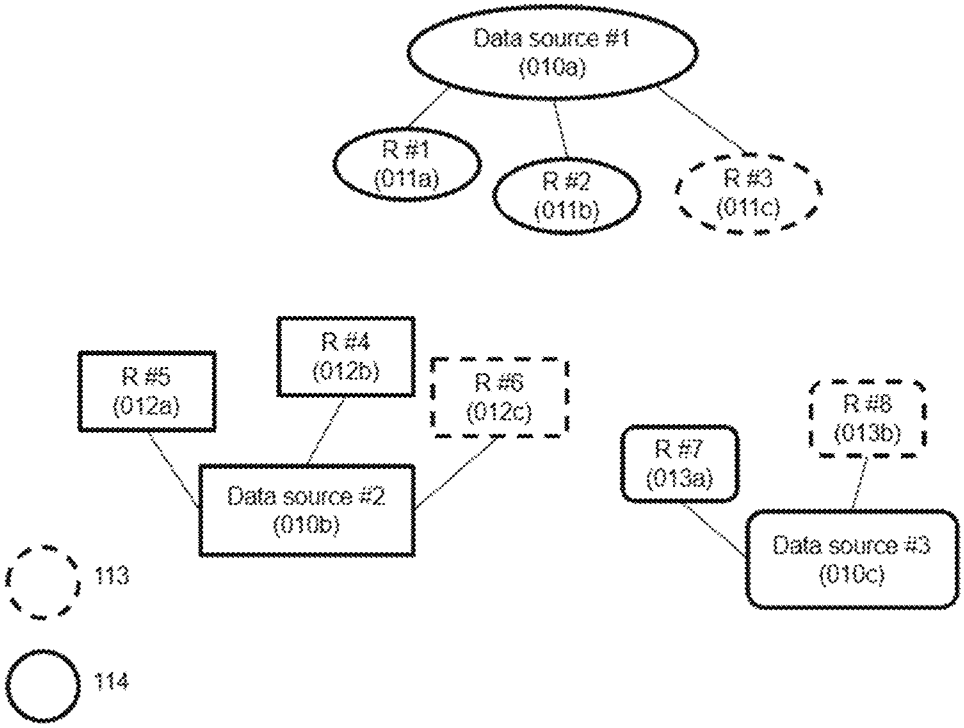
FIG. 2A illustrates a set of data sources along with different raw data available from each of the data sources, according to embodiments of the present disclosure.

FIG. 2A illustrates a set of data sources along with different data representations of each of the data sources. Data source 010*a* has corresponding data representations 011*a*, 011*b*, 011*c*; data source 010*b* has corresponding data representations 012*a*, 012*b*, 012*c*; data source 010*c* has corresponding data representations 013*a*, 013*b*. Some of the raw data indexed by the data representations indicated using dashed lines 113 is not readable by the DAM (i.e. representations with dashed lines are to index the raw data which cannot be parsed by DAM). Some of the raw data indexed by the data representations indicated using solid lines 114 is readable by the DAM (i.e. representations with dashed lines are to index the raw data which can be parsed by DAM). FIG. 2A is provided in order to illustrate the data representations as captured and maintained by the DRM module. As used herein, a data representation may also be referred to as a representation of data source. Accordingly, as mentioned above, the data representations may indicate information regarding the raw data, information regarding the data source providing the raw data, or both. Raw data can be indexed by its corresponding representation of data source.

Figure 2B:
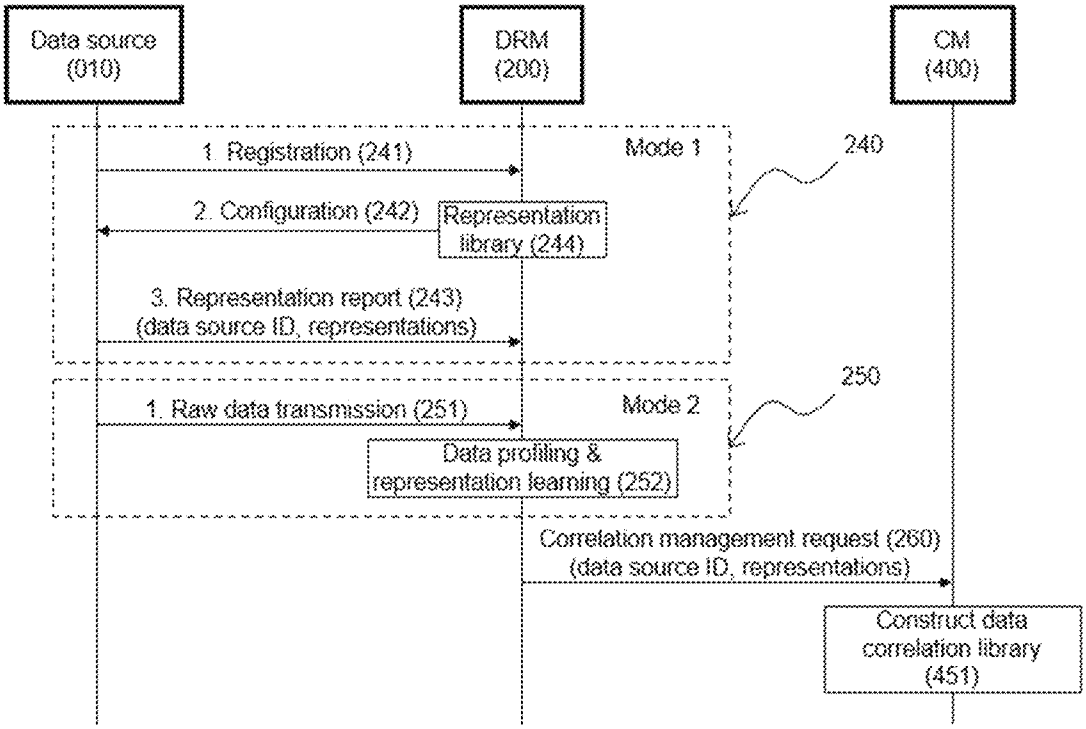
FIG. 2B illustrates two modes via which a representation of data source can be obtained, according to embodiments of the present disclosure.

In various embodiments, a representation of data source can be provided in the form of a Hash code, root of hash, or named with Named Data Networking (NDN) scheme. FIG. 2B illustrates two modes via which a representation of data source can be obtained. In a first mode 240, a data source 010 registers 241 to the DRM module 200 and reports the representations of data items at appropriate granularities e.g. column, table and dataset. The representations to be reported can be configured 242 to data sources by the DRM module 200, and the DRM module can update 244 the representation library (e.g. knowledge base). In more detail, the configuration operation 242, which may be omitted, the DRM module 200 sends (e.g. as part of a request) representation configuration information to the data source 010. The representation configuration information indicates the representation that the DRM module directs the data source to report if the data source can provide related data indexed by the representation. The DRM module may maintain a local representation library and configure parts of the representations in the representation library to data source. Accordingly, the DRM module can generate a representation by requesting a report from a data source and receiving and processing the report (which includes data). Alternatively, the DRM module may receive the representation, for example via the report.

Different application categories may be related with different sets of data representations. The DRM module may obtain the corpus of data representations, and may select and maintain the useful data representations for each application category. The mapping between representations and raw data can be reported 243 by the data source 010 to the DRM module 200. The raw data can be indexed by its representation. If the data source cannot provide related data indexed by the representation, the data source may refrain from performing the report 243.

In the second mode 250, if the raw data can be parsed and analyzed by the DRM module 200, the data representations can be extracted by the DRM module using approaches such as representation learning (embedding) or data profiling (e.g. via auto-encoder). The DRM module 200 may accordingly have the ability to read different formats of data (e.g. RDBMS, HDFS files, and CSV files, text, image, sound, audio, video, sending data, wireless signal data, radio wave signal data) from different data sources, and to extract the corresponding data representations from raw data.

According to the second mode 250, the data source 010 transmits 251 raw data to the DRM module. The DRM module 200 then extracts data representations from the raw data according to the data profiling or representation learning 252. The trained representation learning model or data profiling model can be learned by DRM itself or preconfigured to DRM by other parties. Thus, the DRM module can receive raw data and process this received raw data into a representation.

Subsequently to the first or second mode, the DRM module 200 may send a correlation management request, including the data representations it has collected, to the CM module 400 in the form of a correlation management request 260. The message 260 may include a data source ID along with a representation of the data source. The CM module may construct 451 or modify its data correlation library based at least in part on information in the correlation management request 260.

It is further noted that the DRM module 200 may obtain data source representations with the assistance of the DCP module. For example, the DCP module may interact with and collect data from a data source and then send the data to the CM module.

According to various embodiments, after obtaining the data representations (representations of data source), the DAM correlates the data representations. In order to facilitate this, the CM module operates to detect correlations in the data representations and maintain (track) the detected correlations, for example within a data correlation information library (e.g. correlation library 450). More particularly, the CM module may determine (e.g. track) correlations between different data obtainable from data sources, based at least in part on the data representations collected by the DRM module. In various embodiments, the correlation between different data indexed by the data representations can be indicated by or further evaluated with the correlation of data representations.

In various embodiments, the detected and maintained correlations include correlations between different data. Additionally or alternatively, the detected and maintained correlations may include correlations between data and services, applications, usages, or a combination thereof.

In various embodiments, at least one of the correlations between different data includes an indication of coherence between two or more instances of such different data, which may be raw data as indexed by the data representations. The coherence may include, but is not necessarily limited to one or more of: a degree of equality or inequality; a degree of similarity or dissimilarity; a degree of inclusion dependency or exclusion dependency; and a degree of transitive correlation. The degree of equality or inequality may be indicative of an extent to which the different data instances (items) are equal or unequal in value. The degree of similarity or dissimilarity may be indicative of an extent to which attributes of different data instances, such as data features or data schema, are similar or dissimilar. The degree of inclusion or exclusion dependency can indicate a degree or extent to which the data attribute sets of one of the data instances is included within or not included within (e.g. excluded from) the data attribute sets of another one of the data instances. The degree of inclusion or exclusion dependency can indicate a degree to which data attribute sets of two data instances are disjoint or mutually exclusive. The degree of transitive correlation may correspond to a degree (level) of correlation which is transferred from other fields, e.g. sequence-correlated, combination-correlated. For example, two data items may be sequence-correlated because their values both represent fields of time. As another example, two data items may be combination-correlated because they can be combined to be used together for a task such as an AI training task. As another example, transitive correlation may exist between a first and a second dataset if each of them has a correlation relationship with a third dataset. That is, the two datasets can be correlated via the third dataset; the transitive correlation between the first and the second dataset exists via the third dataset.

In various embodiments, correlations between data and services, applications, usages, or a combination thereof can be or arise from indications that the data can be used for a specific service, application or usage.

Figure 3A:
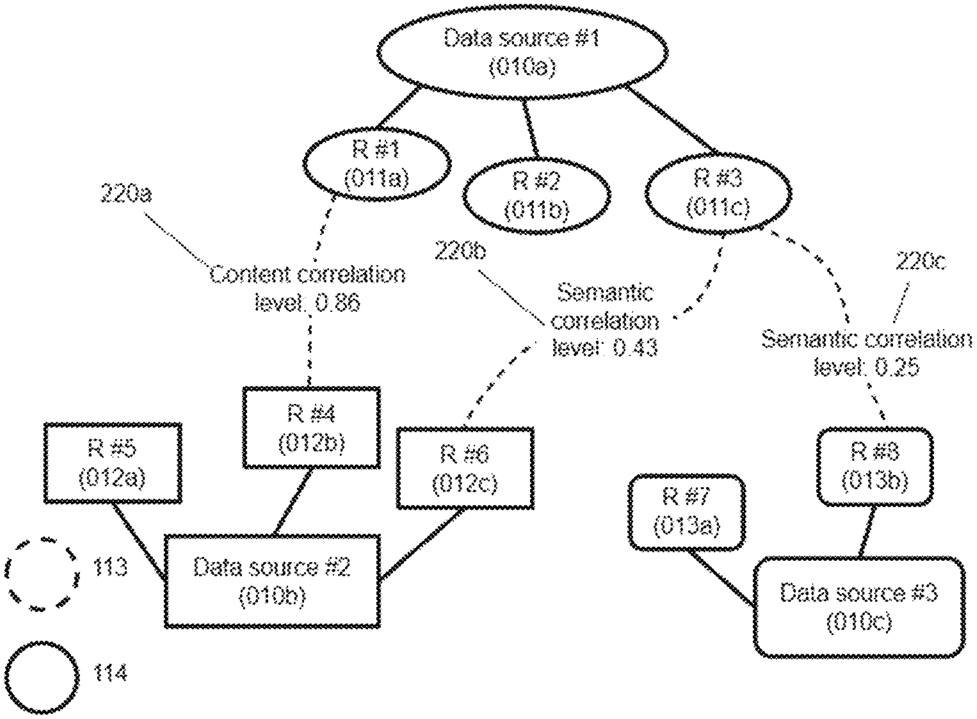
FIG. 3A illustrates correlations between the data sources of FIG. 2A, according to embodiments of the present disclosure.

In various embodiments, the CM module constructs a correlation map, such as a knowledge graph, or an equivalent data structure. This data structure indicates correlations between data sources for example as shown in FIG. 3A. In FIG. 3A, similarly to FIG. 2A, there may be different types of vertices, such as vertices 010*a*, 010*b*, 010*c* indicating data sources and vertices 011*a*, 011*b*, 011*c*, 012*a*, 012*b*, 012*c*, 013*a*, 013*b* indicating data representations. Furthermore, some vertices 011*a*, 011*b*, 012*a*, 012*b*, 013*a* may refer to data representations 114 indexing the raw data which is readable by the DAM (i.e. representations indexing the raw data which can be parsed by DAM), while other vertices 011*c*, 012*c*, 013*b* may refer to data representations 113 indexing the raw data which is not readable by the DAM (i.e. representations indexing the raw data which cannot be parsed by DAM).

As further illustrated in FIG. 3A, edges in the correlation map or graph can be weighted, with the edge weights corresponding to correlation levels (values), correlation types, or a combination thereof. For example, edge weight 220*a* indicates that there is a content correlation between data representation R #1 011*a* and R #4 012*b* of two different data sources #1 010*a* and #2 010*b*, with a correlation level of 0.86. Correlation levels may be correlation coefficients between −1 and 1. A correlation coefficient close to 1 indicates a strong correlation; a coefficient close to −1 indicates a strong anticorrelation, and a correlation coefficient close to 0 indicates a lack of correlation. Another edge weight 220*b* indicates that there is a semantic correlation between data representation R #3 011*c* and R #6 012*c*, with a correlation level of 0.43. Another edge weight 220*c* indicates that there is a semantic correlation between data representations R #3 011*c* and R #8 013*b*, with a correlation level of 0.25. The correlation between the data indexed by the data representations can be indicated by or further evaluated with the correlation of data representations.

The CM module may detect (one or more) correlation levels using one or more of a variety of approaches. In some embodiments, correlation levels may be detected via content evaluation, in which the CM module parses provided raw data, data representations, or a combination thereof. The DRM module may be accordingly configured to send one or more data representations and the data received from one or more data sources to the CM module, and the CM module may evaluate the correlation level of the representations by parsing (processing) both the raw data and at least one of the data representations. Correspondingly, the data management module (i.e. the DRM) may determine correlation levels of one or more correlations of one or more data representations by parsing (processing) both the received data and at least one data representation. The correlation level between the data indexed by the data representations can be indicated by or further evaluated with the correlation level of data representations.

In some embodiments, correlation levels may be detected via a semantic-based evaluation, such as a natural language processing (NLP) or word embedding approach. This may be performed for example in instances where the CM module cannot parse data (e.g. raw data) and instead can only evaluate the data correlation based on data representation. In some embodiments, correlation levels may be detected by reading pre-configuration information. For example, the DRM module can maintain a representation library, and the CM module can be pre-configured to set correlation levels between data representations based on contents of the representation library.

FIG. 3B illustrates example contents 451 of the correlation library, according to an embodiment. The correlation information library can indicate data sources, data sources' correlated representations 455, correlation types 456 and descriptions 457. The correlation between different data sources can be indicated with 3-tuple parameters, for example. A 3-tuple can have the format of (data source 1, correlation type, data source 2), indicating that data source 1 and data source 2 have a correlation of a type indicated by the correlation type.

For example, the first entry 455*a*, [(DS1, DS2); (R1, R4), (R3, R6); 0.86, 0.43] implies that there are correlated representations of data source 1 and data source 2, the correlated representation pairs are, respectively, representation 1 and representation 4, representation 3 and representation 6, the correlation levels for these two pairs are, respectively, 0.86 and 0.43, and the correlation type is similarity 456*a*. A corresponding description 457*a* is also provided to indicate that the entry is to correlate data between data source 1 and data source 2. Moreover, data sources may dynamically register to and deregister from the system. CM can incrementally introduce and update the correlation library e.g. utilizing inference rules (e.g. based on the learned model) and automatic learning methods.

As another example, the second entry 455*b*, [(DS1, DS3); (R3, R8); 0.25] implies that there are correlated representations of data source 1 and data source 3, the correlated representation pair is, representation 3 and representation 8, the correlation level for this pair is 0.25, and the correlation type is inclusion dependency 456*b*. A corresponding description 457*b* is also provided to indicate that the entry is to correlate data between data source 1 and data source 3. It is noted that the contents 451 reflect the situation as illustrated in FIG. 3A.

In various embodiments, data sources may dynamically register to and deregister from the system. Accordingly, the CM module may incrementally introduce and update the correlation library. This may be performed for example utilizing inference rules (e.g. based on the learned model) and automatic learning methods.

Figure 3C:
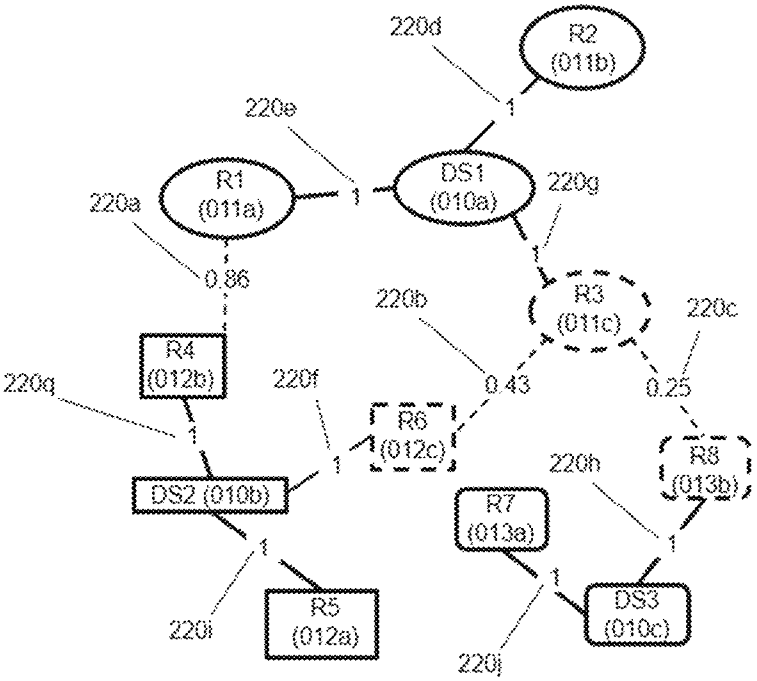
FIG. 3C is a more detailed representation (correlation map) of FIG. 3A, according to embodiments of the present disclosure.

In various embodiments, the CM module may be configured to reduce higher-dimensional correlation information to lower-dimensional correlation information. This may be done in order to extract more important, efficient or useful information. The CM module may maintain different representation correlations for different application categories. For example, FIG. 3C is a representation correlation map of FIG. 3A, with certain edge weights 220*d*, 220*e*, 220*f*, 220*g*, 220*h*, 220*i*, 220*j* set to 1 for completeness. This representation correlation map shown in FIG. 3C corresponds to an original correlation map shown in FIG. 3A. The original correlation map may be reduced to smaller-scale correlation map with fewer vertices and edges. Thus, a reduced correlation map may be provided. This reduction may be performed for example using graph neural network (GNN) processing, graph embedding, link prediction, graph classification, node classification or other machine learning (ML) methods.

Figure 3D:
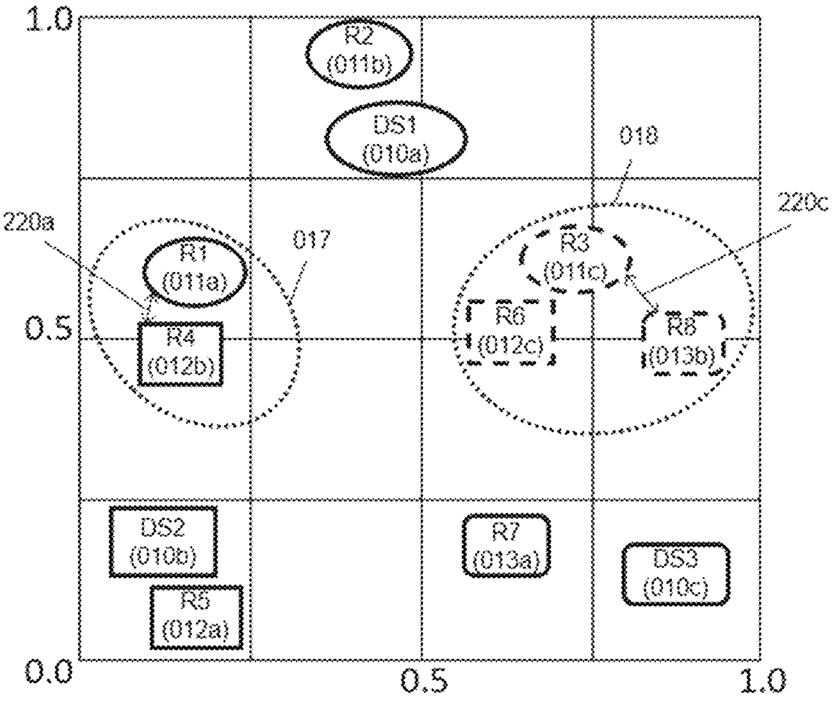
FIG. 3D illustrates a reduced correlation map derived from the map of FIG. 3C, according to embodiments of the present disclosure.
Figure 3E:
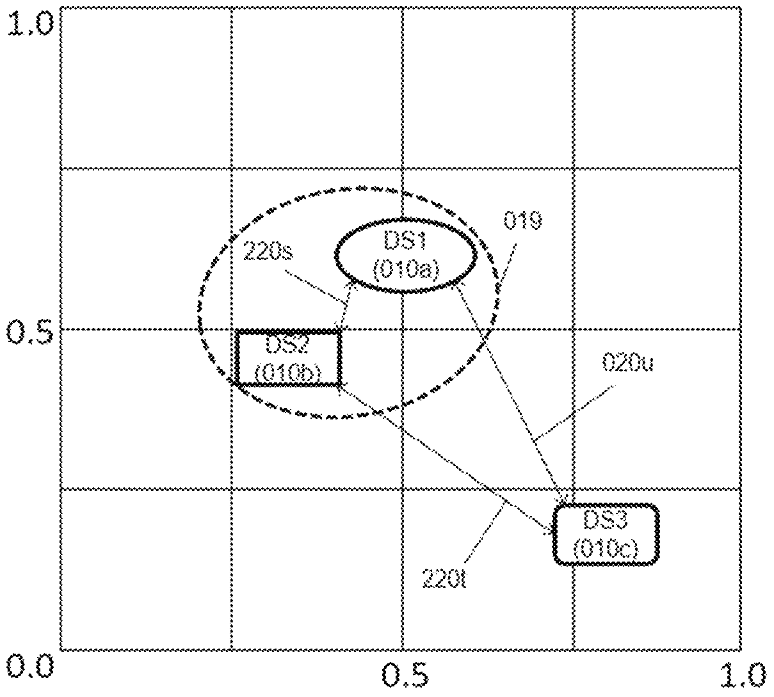
FIG. 3E illustrates another reduced correlation map derived from the map of FIG. 3C, according to embodiments of the present disclosure.

For example, as shown in FIGS. 3C, 3D and 3E, the correlation map may contain different granularities of vertices. The correlation map may contain vertices indicative of data sources and data representations (e.g. as shown in FIG. 3A, FIG. 3C and FIG. 3D), vertices indicative only of data representations, or vertices only indicative of data sources (e.g. as shown in FIG. 3E). The correlation map may contain different numbers of vertices indicative of one or more of: parts of data sources; data representations selected from the whole data source; and a whole representation library. The edge weights each representing a correlation level between two vertices (e.g. as used in FIG. 3C where correlation levels 220*a*, 220*b*, 220*c*, 220*d*, 220*e*, 220*f*, 220*g*, 220*h*, 220*i*, 220*j* are shown using edge weights) may be also represented using other formats. For example, the correlation level may be indicated via the distance between vertices instead of edge weights as in FIG. 3D, and the correlation, may be illustrated between different sources without illustrating representations as in FIG. 3E.

Different maps may provide different levels of flexibility and accuracy for use in a subsequent data discovery procedure. This can facilitate the data discover procedure being faster and/or more efficient.

The representations or data sources which are closely correlated can be embedded into the same group or cluster.

FIG. 3D illustrates a reduced correlation map derived from the map of FIG. 3C, according to an embodiment. In the map of FIG. 3D, data sources and data representations are present. The vertices are placed into coordinate system where the horizontal and vertical coordinates are normalized, for example. The vertices can be mapped into the coordinate system with various embedding methods. The edge weights used in FIG. 3C can be represented with as distances between vertices. In FIG. 3D, the distance between data representation vertices R1 011*a* and R4 012*b* corresponds to the same correlation level of 0.86 220*a* shown using an edge weight in FIG. 3C. Similarly, in FIG. 3D, the distance between data representation vertices R3 011*c* and R8 013*b* corresponds to the same correlation level of 0.25 220*c* shown using an edge weight in FIG. 3C. The distances between vertices may be functions of correlation levels, with closer together pairs of vertices being more highly correlated than further apart pairs of vertices. Closer distance between pairs of vertices implies a higher correlation level. In this format, the closest vertices, such as data representation vertices R1 011*a* and R4 012*b*, can be classified into a group 017. In another example, data representation vertices R3 011*c*, R6 012*c* and R8 013*b* can be classified into another group 0118. Vertices indicative of data sources and/or data representations having the highest correlation may be classified in the same group.

FIG. 3E illustrates a reduced correlation map derived from the map of FIG. 3C, according to another embodiment. In the map of FIG. 3E, data sources are present, but data representations are excluded. Similarly to FIG. 3D, the distances between (data source) vertices correspond to corresponding correlation levels between those vertices. The distance 220*s* between data source vertices DS1 010*a* and DS2 010*b* in FIG. 3E corresponds a correlation level between these same data source vertices, which in FIG. 3C can be inferred from the correlation levels of their one or more data representations, e.g., inferred from edge weight correlation level of 1 220*e* between data source vertex DS1 010*a* and its data representation vertex R1 011*a*, which further has a correlation level of 0.86 220*a* with the data representation vertex R4 012*b*, which further has a correlation level of 1 220*q* with its data source vertex DS2 010*b*. Vertices indicative of data sources DS1 010*a* and DS2 010*b* and having a shorter distance 220*s* (higher correlation level) between each other may be classified in the same group 019, as shown in FIG. 3E. Vertices indicative of data sources DS1 010*a* and DS3 010*c* and having a longer distance 220*u* between each other may not be included in a same group, having insufficiently high correlation level between each other. Similarly, vertices indicative of data sources DS2 010*b* and DS3 010*c* and having a further longer distance 220*t* between each other may not be included in a same group, having insufficiently high correlation level between each other.

The correlation map may contain only data sources even though their corresponding data representations are an important factor in evaluating the correlations of data sources. The reduced map may be stored to reduce storage space, and its correlation information may be easier and/or faster to retrieve when needed. Reduced mappings may also facilitate faster computation and reduced complexity.

As described above with respect to FIG. 2B, the DRM module may send a correlation management request (e.g. message 260), also referred to as an evaluation request, to the CM module, to request the CM module to evaluate the correlation of two or more data representations. Thus, the DRM module interacts with the CM module to initiate the CM module to perform said detecting and maintaining correlations between said different data obtainable from said set of data sources. The message may include one or more parameters. The parameters may be indicative of one or more data representations, for example indicating that the correlation information (e.g. correlation level) of the indicated data representations is to be evaluated. The parameters may include a correlation type indicating that the correlation information of the representation is to be evaluated using the specified correlation type. The parameters may include an indication that the CM module is to determine at least one correlation for example based on an indicated correlation type. The parameters may include an application category identifier, for example indicating the application category that the data representations belong to, or indicating that the CM module is to determine correlation information between the representation and the specified application category, or a combination thereof. The parameters may include a data source identifier identifying one or more data sources which are providing the data representations. The parameters may include one or more memory addresses of the raw data indexed by a data representation, for example based on a memory address the CM module can use to obtain the raw data if CM has appropriate access rights, and then evaluate the data correlation information using content-based evaluation methods. That is, the parameters may indicate one or more computer memory addresses holding raw data of one or more data representations. The correlation between said different data obtainable from said set of data sources can be indicated by or further evaluated with the correlation of data representations.

In various embodiments, the DSD module is configured to receive a request from a data consumer, and assist the data consumer in determining data sources hosting required data. If necessary, the DSD module may also select, configure and activate one or more appropriate DCP instances, controllers, points, or a combination thereof, to perform data collection, data delivery and, if necessary, data preprocessing. The request from the data consumer may be used to request data. Accordingly, the DSD module may determine the data which is requested by the data consumer. The determination can be made according to information in the request, and at least one data representation. Determining the data can include collecting raw data, or collecting and processing raw data.

Figure 4:
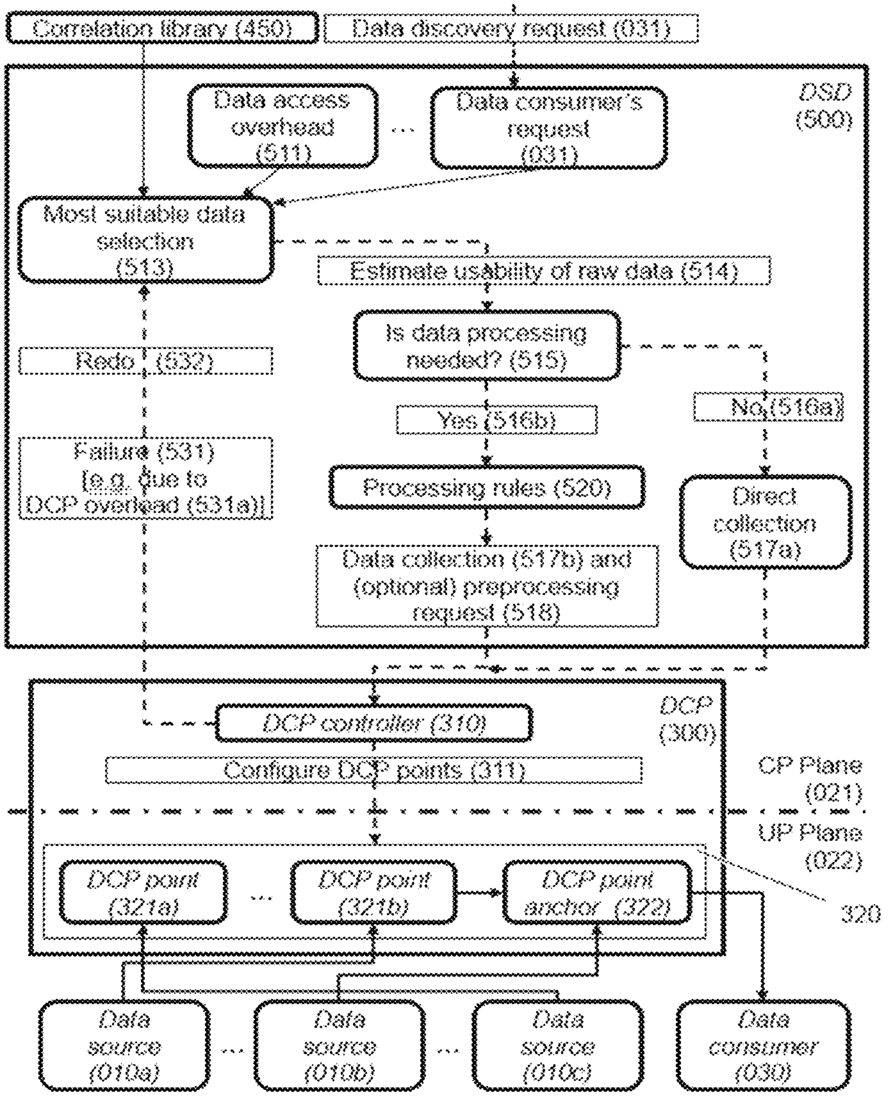
FIG. 4, FIG. 5A and FIG. 5B illustrate operations of a DAM, according to embodiments of the present disclosure.
Figure 5A:
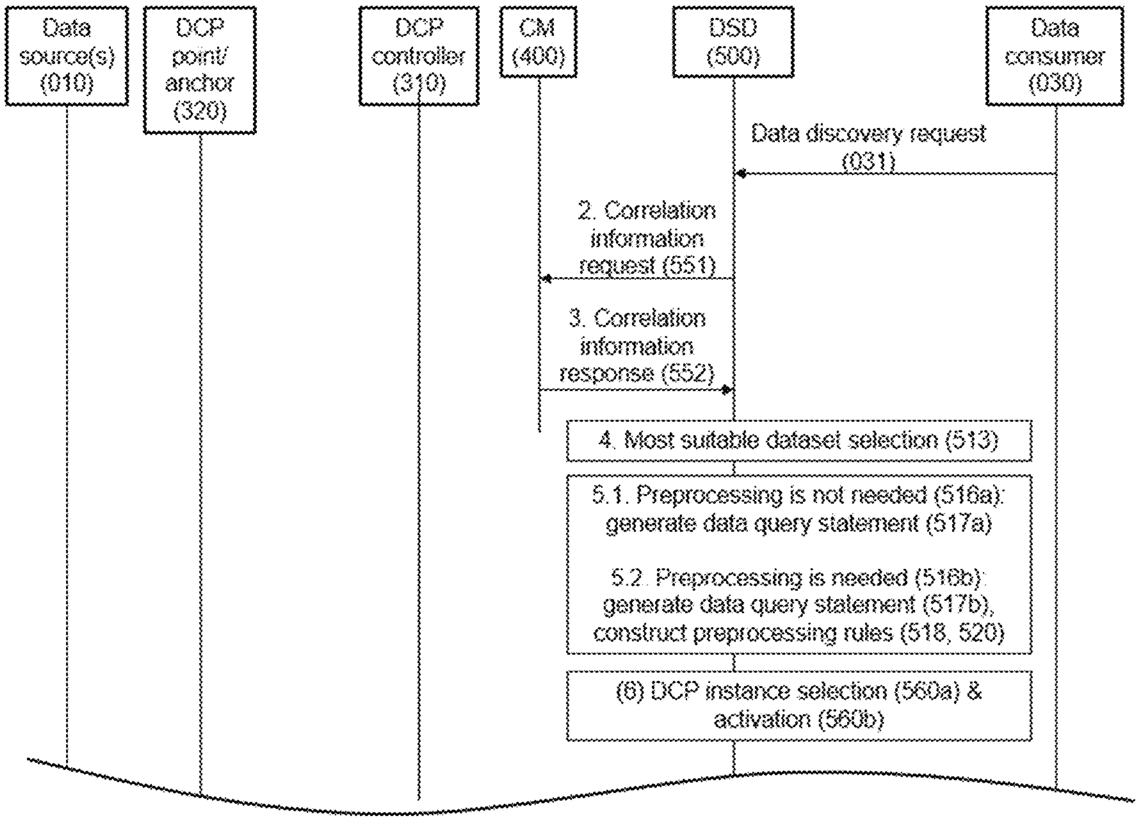
Figure 5B:
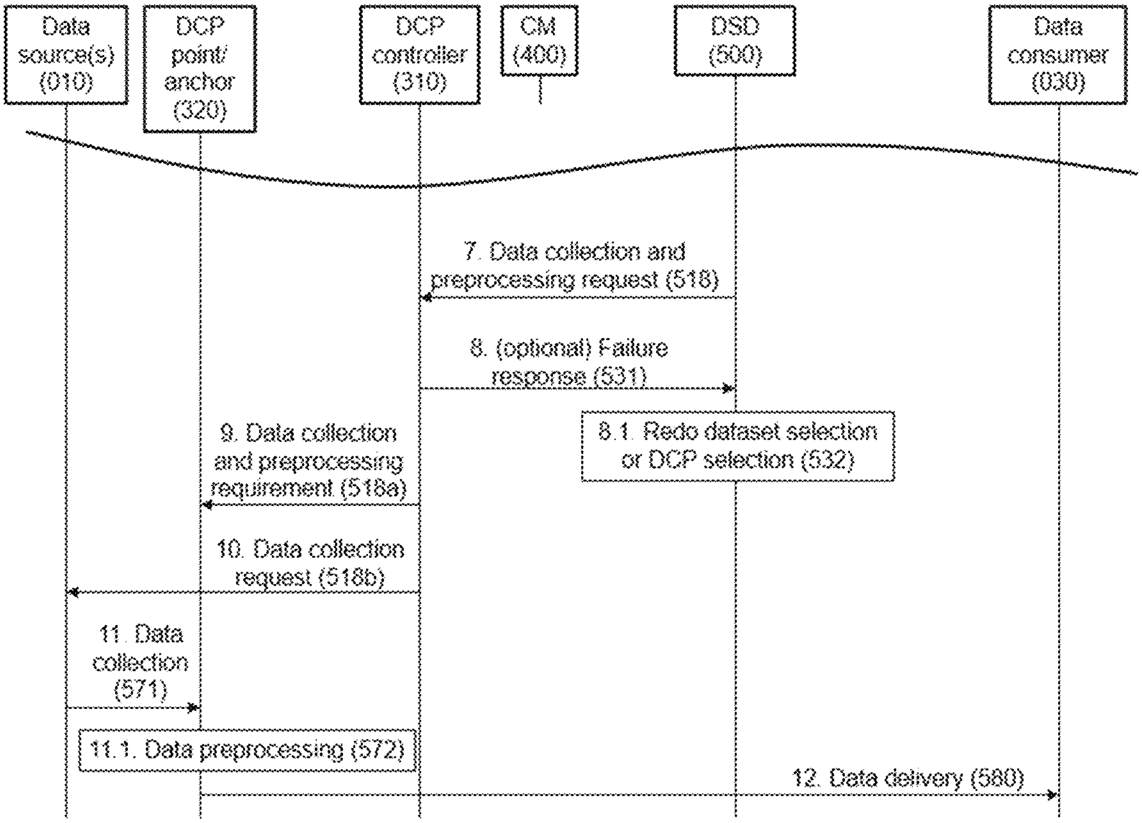

FIG. 4, FIG. 5A and FIG. 5B illustrate operation of a DSD module 500 according to embodiments of the present disclosure. In various embodiments the DSD module operates to facilitate (e.g. best) data sources 010 (e.g. data source instances 010*a*, 010*b*, 010*c*) selection. This may be done to help the data consumer discover and select (e.g. the most) suitable data sources and data items for a given task. This may include, for example, discovering and selecting data sources hosting the correlated datasets required by multiple parties of a data consumer, or required by multiple consumers, in view of a joint consideration of the representation correlation information (obtained from CM module for example via the correlation library 450), data access overhead (e.g. 511 in FIG. 4), and data consumer's requirement (as communicated via a (e.g. data discovery) request 031 from the data consumer 030). The data consumer's requirement may for example include a data dependency required by multiple parties of a data consumer, or an application category in which the data is to be used by the data consumer.

In various embodiments, the DSD module operates to perform data query statement generation. The data query statement is generated to indicate types of raw data to be collected from specified data sources. The DSD module may generate a query plan as a result of interacting with the data consumer component. The query plan may indicate the data to be collected and members of (one or more) data sources from which the data is to be collected. The DSD module may determine the involved data sources and data representations in order to satisfy data consumer's requirement. The DSD module may determine the types of raw data to be collected from and the data sources from which the types of raw data are to be collected. Based on such determinations, The DSD module may generate a query statement and trigger a data query request, including the query statement, to the DCP module.

In various embodiments, the DSD module operates to determine data collection and (where required) data preprocessing rules to be implemented. The data preprocessing rules may indicate how the target data to be provided to the data consumer can be obtained from the raw data collected from the data sources. For example, one or more data preprocessing rules can specify how to modify and clean non-directly useable data, and to filter out irrelevant or redundant data.

For example, a data preprocessing rule may include one or more rules for stitching together non-directly usable data. The rule may specify operations to find intermediate data items to be used in stitching (merging) the non-directly usable data together. This may be performed for example when a data consumer requires a composite data set that is not available from any single data source. Thus, data from two, three or more data sources can be merged together to form combined data. Rules for filtering, cleaning and normalizing data can similarly be determined.

In various embodiments, the DSD module operates to select one or more DCP module instances to invoke to perform data collection and (where required) data preprocessing. The selection may be based on one or more of: data access overhead, communication link state between data source sand data consumer, locations of DCP module and data consumer, DCP module ability (e.g. DCP module's supported category ID, DCP module's data transmission or computing load), data consumer's mobility, and DCP module's mobility. The DCP module's ability can be made known to the DSD module via a registration operation or via a notification from a DCP module instance. The selection may be based at least in part on the data collection actions to be performed.

The DSD module may further operate to configure and activate the selected DCP module (e.g. the selected instances thereof) to perform the data collection and data preprocessing actions. This may be done for example via one or more configuration instruction messages.

FIGS. 4, FIG. 5A and FIG. 5B illustrate operations of a DAM and modules thereof, according to embodiments of the present disclosure. As illustrated in FIG. 4, FIG. 5A and FIG. 5B, the DSD module 500 may interact with the data consumer 030 by receiving a (e.g. data discovery) request 031 from the data consumer 030. The DSD module 500 may further process contents of the request 031 that may indicate an application category identifier indicative of a category that results of the data collection actions may be used for. The request 031 may indicate one or more features (e.g. data representation) of data required by the data consumer component 030. The request 031 may indicate a number of (e.g. correlated) datasets required by the data consumer component 030. The number of datasets may be, for example, a number of different data records indexed by different IDs. The request 031 may indicate dependencies (e.g. indicated using AI model type such as VFL or HFL, or data ID and feature alignment) of datasets required by multiple parties and a required correlation between such datasets. The request 031 may indicate an address of a (e.g. one or more) device of the data consumer which is designated to receive results of the set of data collection action. The request 031 may indicate one or more final target data requirements (e.g. data format, data structure) for results of the set of data collection actions to be transmitted to the data consumer. Based on such parameters, the DSD module may configure the DCP module to perform data collection actions.

The DSD module 500 may send a correlation information request 551 (e.g. via a message) to the CM module 400. The correlation information request 551 may specify one or more types of correlations requested by the data consumer component 030 (e.g. via request 031). The correlation information request 551 may include a request for the CM module 400 to identify the specified one or more types of correlations between members of different data obtainable from the (e.g. a set of networked) data sources 030. The correlation information request 551 may include an application category identifier indicating an application which the required correlation information is to be related to. The correlation information request 551 may include one of the representations of data sources which the required correlation information is related to. The correlation information request 551 may include a correlation type which the required correlation information is related to.

The CM module 400 may send a correlation information response 552, which may include some or all of the corresponding data correlation information requested via the correlation information request 551, to the DSD module 500. The CM module 400 may obtain the data correlation information for example from or via the correlation library 450.

The DSD module 500 may select the most suitable data based on at least some of the following: the data correlation information received from the CM module 400 via the correlation information response 552, data access overhead 511, and data requirement of the data consumer component 030 (e.g. as specified via the (e.g. data discovery) request 031).

The DSD module 500 may check 514 whether or not the (raw) data can be used by the data consumer component 030. If yes, then data preprocessing is not needed (516*a*) and the DSD module 500 may generate a corresponding data query statement 517*a*. If no, then the raw data may be preprocessed (516*b*) so that it is usable by the data consumer component

030, in which case the DSD module 500 may generate a (possibly different) corresponding data query statement 517*b* and request data preprocessing (518) for example via constructing preprocessing rules 520 that may be used by the DCP module 300 to execute data preprocessing. The DSD module 500 may configure the DCP module 300 to perform a set of data collection actions based at least in part on the (e.g. data discovery) request 031 received from the data consumer component 030.

Based on the set of data collection actions, the DSD module 500 may configure the DCP module 300 to select (560*a*) suitable (one or more) DCP module instances to perform the set of data collection actions that may include (if needed) data preprocessing. The DSD module 500 may configure (560*b*) said (one or more) DCP module instances to perform one or more of the set of data collection actions.

The DSD module 500 may send a data collection and (if needed) preprocessing request (message) 518 to the DCP module 300 (e.g. via a DCP controller 310) to activate a DCP module instance to collect and (if needed) preprocess the data. The data collection and (if needed) preprocessing request 518 may include one or more configuration parameters, as described below.

The configuration parameters may include an identifier of a DCP point device (i.e. a DCP module instance) to be configured and activated. The configuration parameters may include an indication of whether preprocessing on obtained data needs be performed. The configuration parameters may include an indication of raw data to be collected from specified members of the set of (e.g. networked) data sources. A data query statement (e.g. 517*a* or 517*b*) may be used to indicate what raw data should be collected from which data sources, such as (one or more) specific data representations indicating the representations of the data to be collected, a data source address indicating the address of the data source providing the data. The data query statements may for example have a format of [(representation #1, data source #A); (representation #2, data source #B); . . . ].

The configuration parameters may include an address of a (or each) data consumer component device to which the DCP module is to forward output toward. The configuration parameters may include an indication of a requirement on final target data to be transmitted to the data consumer component, for example a data type (e.g. data format), (optional) number of datasets, and (optional) dependency of datasets (e.g. on ID or feature alignment). The configuration parameters may include an indication of one or more rules (e.g. preprocessing rules 520) to be applied via data preprocessing on the obtained (raw) data.

The preprocessing rules may indicate how the obtained data is to be preprocessed to obtain the final target data. Preprocessing can include (and the associated rules can be indicative of) one or more of: merging the obtained data (e.g. stitching); filtering the obtained data (e.g. removing useless or redundant data); cleaning the obtained data, normalizing the obtained data, or both; specifying one or more indications of portions of the obtained data to which the associated (one or more) preprocessing rules are to be applied; and specifying one or more conditions triggering implementation of the associated (one or more) preprocessing rules.

The preprocessing rules may indicate one or more conditions (e.g. step sequence, timestamp, trigger event, indexing the data) which are to be met before the DCP module (or its one or more devices or instances) may perform data preprocessing. An example of a preprocessing rule can be: [step 1 (or indicated with trigger event, or timestamp): stitch the data from data source A and B; step 2 (or indicated with trigger event, or timestamp): filter the redundant data indexed by representation in the new data obtained in step 1; step 3 (or indicated with trigger event, or timestamp): clean the new data obtained in step 2; . . . ].

The configuration parameters may include an indication of one or more data correlations between different involved ones of said representation of data sources, the indication being used in the preprocessing on the obtained data.

In various embodiments, each of the one or more devices or instances of the DCP module may be configured (e.g. by the DSD module) to provide an indication of capabilities thereof to the DSD module. Such indication of capabilities may be used by the DSD module in configuring the DCP module based at least in part on the indication of capabilities.

In various embodiments, for any one of a variety of reasons (e.g. when the DCP module cannot obtain the target data successfully, or the DCP module rejects the DSD module's request for example due to data communication overload or a computing overload 531*a*), the DCP module 300 (or one of its devices or instances) may fail to perform data collection and (if needed) preprocessing. In such cases, the DCP module 300 (e.g. via DCP controller 310) may send a failure response (message) 531 to the DSD module 500 indicating the failure. In response to receiving the failure response 531, the DSD module 500 may initiate a repeat 532 of the data collection actions, described previously, to find suitable data and/or another available DCP module instance to perform the (one or more) data collection actions.

Figure 6A:
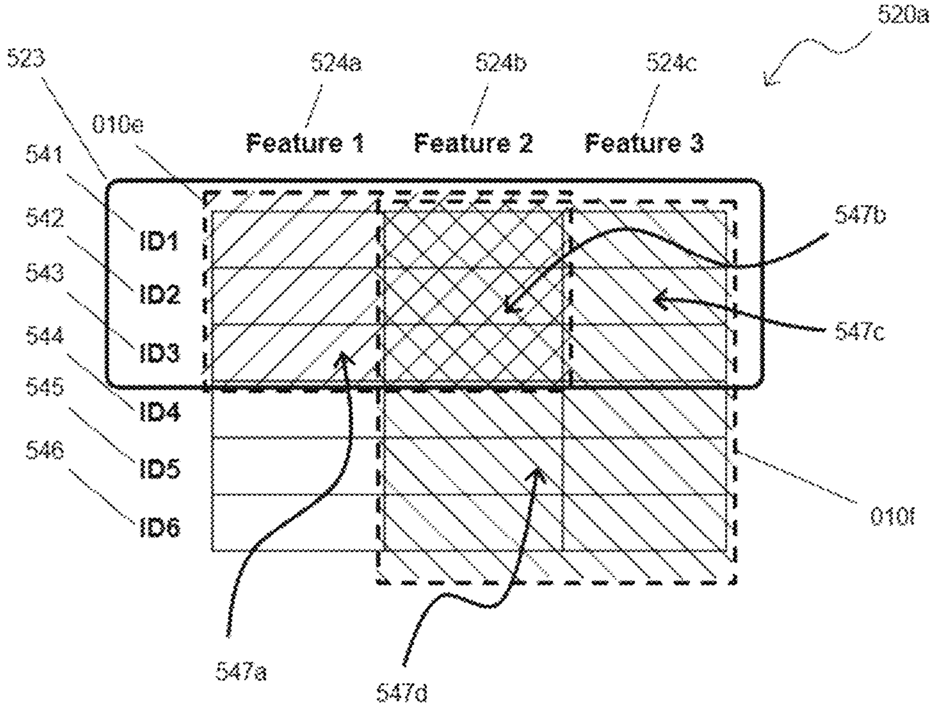
FIG. 6A, illustrates overlap of data sets provided by two different data sources, according to embodiments of the present disclosure.

For example, as illustrated in FIG. 6A, participant A (of data consumer component) may require a target data 523 (represented by Feature 1 524*a*, Feature 2 524*b* and Feature 3 524*c* of ID1 541, ID2 542 and ID3 543), for example for Horizontal Federated Learning (HFL). The DSD module may discover a first data 010*e* from a first data source and a second data 010*f* from a second data source that together constitute (at least) the required data. Additionally or alternatively, said data discovery may be performed by the DCP module (or one or more of its devices, points or instances) which may be configured by the DSD module to obtain the data which may, if needed, include preprocessing the data as required by participant A. None of the first or the second data sources can provide the required target data 523 alone. However, the raw first data 010*e* of the first data source and the raw second data 010*f* from the second data source may be preprocessed to obtain the required target data 523. The DSD module may configure one or more data preprocessing rules for execution by the DCP module (or one of its devices or instances) to preprocess the non-directly useable first data 010*e* and second data 010*f* by combining them together. Such combining results in a partial data A 547*a* (represented by Feature 1 524*a* of ID1 541, ID2 542 and ID3 543), all of which is a part or the required target data 523. Such combining also results in a partial data B 547*b* (represented by Feature 2 524*b* of ID1 541, ID2 542 and ID3 543), all of which is twice a part or the required target data 523 (once from data 010*e* and once from data 010*f*). Since data in the partial data B 547*b* is repeated twice, the preprocessing may include removing repeated data and keeping only one copy to be included in the required target data 523. Such combining further results in a partial data C 547*c* (represented by Feature 3 524*c* of ID1 541, ID2 542 and ID3 543), all of which is a part or the required target data 523. Such combining further results in a partial data D 547*d* (represented by Feature 2 524*b* and Feature 3 524*c* of ID4 544, ID5 545 and ID6 546), none of which is a part or the required target data 523. Since data in the partial data D 547*d* is not required by the target data 523, it can be removed during preprocessing.

Figure 6B:
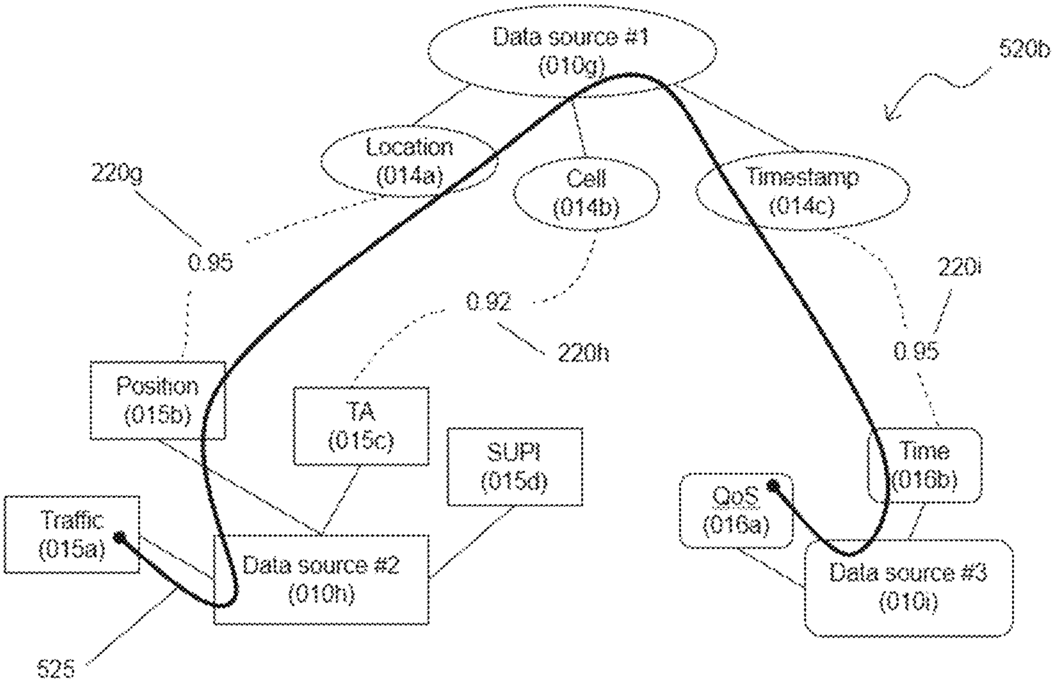
FIG. 6B illustrates a correlation map including information on several data sources and their representations, according to embodiments of the present disclosure.

For example, as illustrated in FIG. 6B, a correlation map 520*b* may include information on several data sources and their one or more representations, such as: representations of Location data 014*a*, Cell data 014*b* and Timestamp data 014*c* which can be provided by the Data Source #1 010*g*; representations of Traffic data 015*a*, Position data 015*b*, Tracking area (TA) data 015*c* and Subscription Permanent Identifier (SUPI) data 015*d* which can be provided by the Data Source #2 010*h*; and representations of Quality of Service (QoS) data 016*a* and Time data 016*b* which can be provided by the Data Source #3 010*i*. Some of the representations may be correlated. For example, Position data 015*b* may be correlated with Location data 014*a* having a correlation value of 0.95 220*g*; TA data 015*c* may be correlated with Cell data 014*b* having a correlation value of 0.92 220*h*; and Timestamp data 014*c* may be correlated with Time data 016*b* having a correlation value of 0.92 220*i*.

In an example embodiment, the data consumer component may require target data 525 which includes the Traffic data 015*a* and the QoS data 016*a*. The DSD module may configure the DCP module (or one of its devices or instances) to obtain the required target data 525 using the correlations map 520*b*. The Traffic data 015*a* can be obtained from the Data Source #2 010*h* and the QoS data 016*a* can be obtained from the Data Source #3 010*i*, which do not have a direct correlation according to the correlations map 520*b*. However, the known correlations of data source representations, as described above, can be used to combine their corresponding data to obtain the required target data 525.

Continuing with the above example, the required Traffic data 015*a* can be correlated with the required QoS data 016*a* using the correlations map 520*b* as follows: the Traffic data 015*a* can be combined (e.g. stitched) with the Position data 015*b* because both are representations of the same Data Source #2 010*h*; then the Position data 015*b* can be combined with the Location data 014*a* of the Data Source #1 010*g* because they have a relatively high correlation value of 0.95 220*g* (combining Position data 015*b* with the Location data 014*a* is preferred over combining the TA data 015*c* with the Cell data 014*b* because the former has a higher correlation level of 0.95 220*g* compared to the correlation level of the latter of 0.92 220*h*); then the Location data 014*a* can be combined with the Timestamp data 014*c* because both are representations of the same Data Source #1 010*g*; then the Timestamp data 014*c* can be combined with the Time data 016*b* of the Data Source #3 010*i* because they have a relatively high correlation value of 0.95 220*i*; and lastly, the Time data 016*b* can be combined with the QoS data 016*a* because both are representations of the same Data Source #3 010*i*.

The combined raw data from all the combinations described above can be then preprocessed by the DCP module (or one of its devices or instances) configured accordingly by the DSD module, for example in a manner described above with reference to FIG. 6A, to obtain the required target data 525.

The functions of the DCP module may include at least one of the following: acquiring the data from one or more data sources, (if needed) performing data preprocessing as configured by the DSD module via data preprocessing rules, and delivering the required target data to the data consumer component.

As illustrated in FIG. 4, FIG. 5A and FIG. 5B, the DCP module 300 may include the DCP controller 310 and one or more DCP points (also referred to as DCP module devices or DCP module instances) 320, such as a first DCP point 321*a* and a second DCP point 321*b*. The one or more DCP points 320 include a DCP point anchor 322. The DCP point anchor is the DCP point which delivers the required target data to the data consumer component, for example in a service procedure. Other non-anchor DCP points typically do not interact with the data consumer component directly. Other (one or more) DCP points may transmit the collected and preprocessed data to the DCP point anchor which then delivers the required target data to the data consumer component. The DCP point anchor may be a unique entity used to deliver the required target data to the data consumer component. Use of the DCP point anchor may at least contribute to reducing the complexity of target data delivery to data consumer component, potentially facilitates unified scheduling and management or the delivery of the target data, or a combination thereof.

The DCP points 320 are responsive to configuration instructions by the DCP controller 310. The configuration instructions cause or configure the DCP points 301 to collectively perform the set of data collection actions.

The DCP controller 310 may be deployed in a control plane (CP) 021 and the DCP points 320 may be deployed in a user plane (UP) 022 or a data plane. Several DCP points may operate cooperatively to serve a specific data consumer component. Along with configuring of the DCP module by the DSD module, one of the DCP points 320 is configured to operate as the DCP point anchor 322 to provide results of the set of data collection actions to one or more devices of the data consumer component. Thus, the DCP module is configured to provide results of data collection actions to a data consumer.

As further illustrated in FIG. 4, FIG. 5A and FIG. 5B, the DCP controller 310 may receive a data collection and (if needed) data preprocessing request 518 from the DSD module 500. Data to be collected, its possible corresponding data sources, and required target data may be indicated via the data collection and (if needed) preprocessing request 518.

Based on the data collection and (if needed) preprocessing request 518, the DCP controller 310 can alternatively (to the DSD module itself) configure (e.g. determine and optimize) the preprocessing rules 520. This may occur if the preprocessing rules 520 are not included in the data collection and (if needed) preprocessing request 518 or if the included preprocessing rules 520 need to be optimized to minimize the communication and/or computing overhead, for example. Accordingly, the DCP controller or another DCP device can determine (e.g. optimize) resource scheduling in support of data collection, preprocessing, or both.

In various embodiments, in configuring the DCP points (e.g. 321 in FIG. 4) the DCP controller may select specific one or more DCP points of the plurality of the DCP points and select the DCP point anchor for required target data delivery to the data consumer component. Such selections may be based, for example, on one or more of: the DCP point location; mobility of the data consumer component (e.g. to ensure the coverage area of the selected DCP point anchor includes the moving or stationary data consumer component, thus reducing the data switch or handover); minimizing the data access overhead (e.g. data collection overhead, data delivery overhead); communication link state (s) (e.g. selecting a DCP point to be the anchor which already has an established or potentially better (e.g. more reliable, stronger, faster) communication link with the data source and/or the data consumer component, for example to improve data handover speed and/or minimize link setup delay and overhead); capability of a specific DCP point (e.g. a DCP point having the required preprocessing capability, sufficient computing resources, lower load); and combinations thereof.

In various embodiments, in configuring the DCP points (e.g. 321 in FIG. 4) the DCP controller 310 may perform an optimization of resource scheduling in support of performing the set of data collection actions. As a result of such optimization, the DCP controller may configure a communication and data preprocessing execution policy that may allow the specific one or more DCP points to collect data from corresponding data sources while minimizing operational overhead (e.g. bandwidth and latency).

In various embodiments, in configuring the DCP points (e.g. 321 in FIG. 4) the DCP controller may configure and activate the specific one or more DCP points and distribute an (one or more) individual task of set the data collection and preprocessing tasks to a specific DCP point via data collection and preprocessing requirement (message) (e.g. shown as 518*a* in FIG. 4 and FIG. 5B).

In various embodiments, the data collection and preprocessing requirement (message) may cause the at least one of the DCP point devices to perform one or more data collection tasks, data preprocessing tasks, or both. Such tasks may be configured based on contents of the data collection and preprocessing requirement (message).

In various embodiments, the data collection and preprocessing requirement (message) may include one or more parameters described below.

Such parameters may include an identifier of one of the DCP point devices (instances) to be configured and activated.

Such parameters may include an indication of whether or not data preprocessing is required.

Such parameters may include a data query statement indicating types of raw data to be collected from specified ones of the set of (e.g. networked) data sources, and, for example, may have a format of [(representation #1, data source #A); (representation #2, data source #B); . . . ] indicating to collect data indexed by representation 1 from data source #A and to collect data indexed by representation 2 from data source #B and so on.

Such parameters may include an address of a device to which said at least one of the DCP point devices is to forward output toward. Such device may be another DCP point device if the forwarding DCP point device is not a DCP point anchor. Such device may be a data consumer component device if the forwarding DCP point device is a DCP point anchor.

Such parameters may include a requirement on final target data to be transmitted to the data consumer component.

Such parameters may include a data preprocessing rule indicating how the collected raw data is to be preprocessed to obtain the final or required target data. Such data preprocessing rule may include one or all of: one or more specific preprocessing actions (e.g. data stitching, data filtering, data cleaning, etc.); required data representations (e.g. to index the data to be preprocessed); and a (one or more) condition which must be met before performing a given preprocessing action (e.g. step sequence, timestamp, trigger event). As an example, such data preprocessing rule can be [step 1 (or indicated with trigger event, or timestamp): stitch the data from data source A & B; step 2 (or indicated with trigger event, or timestamp): filter the redundant data indexed by representation in the new data obtained in step 1; step 3 (or indicated with trigger event, or timestamp): clean the new data obtained in step 2; . . . ].

In various embodiments, the data source can be also a DCP point device (instance).

An example of the data collection and preprocessing requirement (message) may be: [DCP point #1: collect data indexed by representation 1 from data source A, preprocessing rule 1, timestamp/trigger event/step number 1, data receiver 1 (e.g. another DCP point); . . . ; DCP point anchor: collect data indexed by representation n from data source N, preprocessing rule n, timestamp/trigger event/step number n, data receiver n (i.e. data consumer component)]. In other words, the DCP point #1 needs to collect data indexed by representation 1 from data source A, and DCP point #1 preprocesses the collected data with the preprocessing rule 1 when timestamp/trigger event/step number 1 happens, and then outputs the preprocessed data to another DCP point 1; similar or different instructions for other one or more DCP points . . . ; DCP point anchor needs to collect data indexed by representation n from data source N, and DCP point anchor preprocesses the collected data with the preprocessing rule n when timestamp/trigger event/step number n happens, and then delivers the final target data to receiver n, i.e. the data consumer component.

As further illustrated in FIG. 5B, the DCP controller 310 may send a data collection request to request each data source (e.g. first data source 010*a*, second data source 010*b*, third data source 010*c*) to send data to a (e.g. specific) DCP point device (e.g. to DCP point 321*a* or DCP point anchor 322). The data collection request may include one or more parameters e.g., data representation, DCP point ID.

The DCP point and/or the DCP point anchor collects raw data from one or more data sources and (if needed) preprocesses the raw data to the final (required) target data. The DCP anchor then sends the final (required) target data to data consumer component.

According to embodiments as described above, a DAM platform includes a DRM function configured to obtain the representations (e.g. used as index of raw data) of data sources to indicate kinds of data which can be provided by different data sources, a CM function configured to manage the data source correlations, a DSD function configured to select correlated datasets for multiple parties and determine data preprocessing rules, and DCP module configured to execute the data preprocessing of non-directly useable data, irrelevant or redundant data.

Furthermore, according to the above, the DAM platform can accordingly determine correlations between obtainable data, and determine data requested by a data consumer. The determining of data requested by the data consumer can be performed according to the request itself, along with obtained and computed information, such as the representations of data sources and the determined correlations. Determining the data requested by the data consumer can also include generating a query plan and determining the data requested according to execution of the query plan. The determined data, as requested by the data consumer, can be provided by the DAM platform to the data consumer.

In various embodiments, possible features or advantages of the systems and methods described herein include one or more of: obtaining (e.g. capturing and managing) information on data sources and their corresponding data representations; creating and maintaining correlations of representations of data sources and using said representations and correlations to obtain (e.g. discover, collect) raw data; further using said representations and correlations to preprocess the raw data if it is not directly-useable by the data consumer component to obtain the required target data and delivering it to the data consumer component possible contributing to increasing the data usability and reducing the data collection overhead. Possible features or advantages include assisting the data consumer component in discovering and selecting (e.g. the most) suitable datasets in the following situations: situations where the required target data is not clearly defined by the data consumer component; and situations where multiple parties of the data consumer need a number of required target datasets which are correlated.

In some cases, multiple parties of a data consumer component may require a number of target datasets which are correlated. The required target datasets may not always be clearly defined by the data consumer component and, as a result, DAM may receive a limited information regarding the required target datasets.

Conventionally, target datasets may be required by multiple parties of the data consumer component for a Federated Learning (FL). A FL computing platform can be provided for example by a service provider (e.g. NET4AI) which provides (network) connection and AI computing service. There are typically multiple FL participants (i.e. parties) and a collaborator in FL. Each FL participant uses a training dataset to train sub-models. While the training dataset of each FL participant cannot be disclosed to other FL participants or to the FL collaborator, each FL participant can transmit a trained intermediate parameter (e.g. a gradient value) to the FL collaborator. The FL collaborator can then aggregate all intermediate parameters received from multiple FL participants into a one or more aggregated parameter, and then transmit the one or more aggregated parameter to each FL participant. Based on the one or more aggregated parameters received from the FL collaborator, each FL participant can update its local sub-model. The procedure described above can be repeated until the sub-model training ends.

FL can be classified into horizontal federated learning (HFL) and vertical federated learning (VFL). There can be significant constraints on the FL training datasets of the multiple FL participants. For example, in HFL, the HFL participants require target datasets with less data ID overlap and more data feature overlap; while in VFL, the VFL participants require target datasets with more data ID overlap and less data feature overlap.

There may be a number of potential data sources for FL, however systems are typically not able to determine which ones of the potential data sources to federate while achieving the most dataset intersections (e.g. correlations) that would result in optimum AI training performance. Allowing such systems to try all possible combinations of all potential data sources in order to choose the optimum data sources that would provide the required target datasets may be technically impractical and time and resource consuming.

In FL, for the purpose of obtaining the required target data, it may be beneficial to not consider multiple FL participants as independent, since their respective required target data sets may be correlated. The required target datasets are correlated (e.g. on ID and feature alignment in VFL and HFL, respectively) and not independent.

Figure 7A:
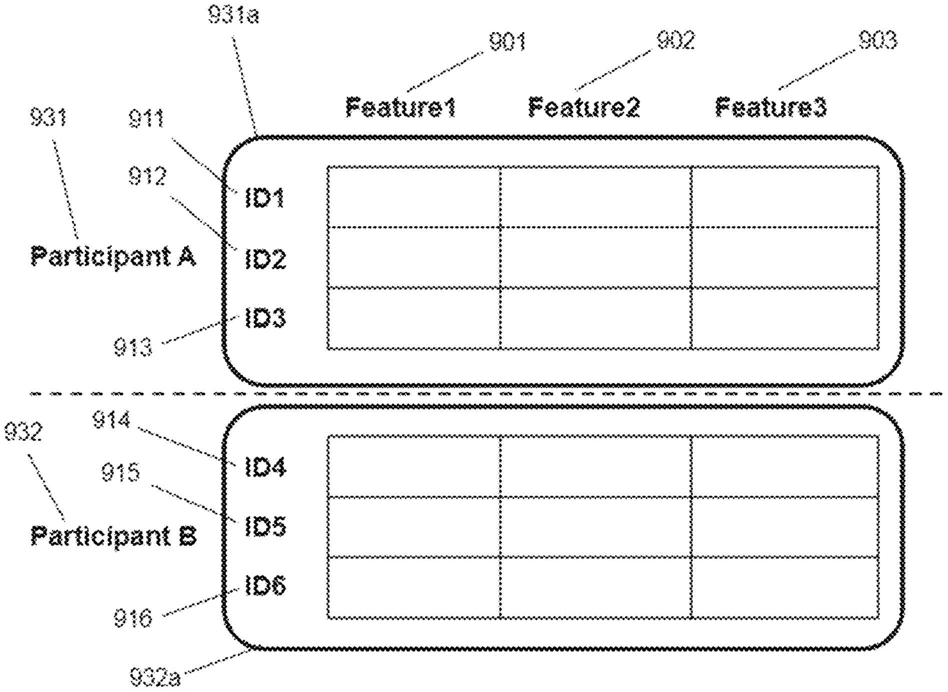
FIG. 7A illustrates a horizontal federated learning scenario, according to embodiments of the present disclosure.
Figure 7B:
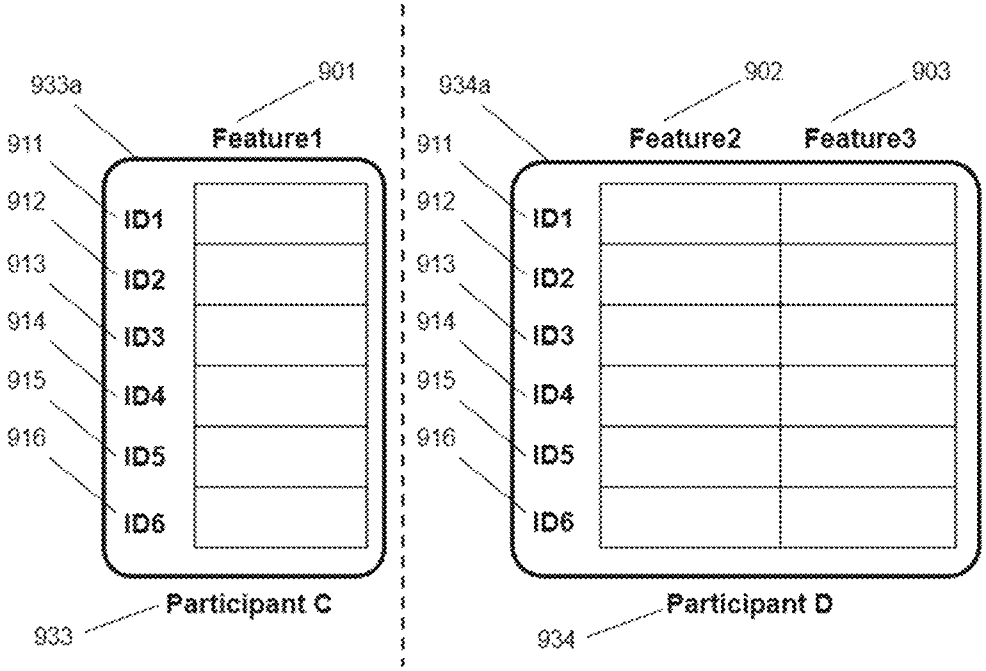
FIG. 7B illustrates a vertical federated learning scenario, according to embodiments of the present disclosure.

For example, FIG. 7A illustrates a HFL scenario, while FIG. 7B illustrates a VFL scenario. In FIG. 7A, Participant A 931 and Participant B 932 require respective data sets 931*a* and 932*a* with feature overlap, i.e. each data set 931*a* and 932*a* contains entries describing the same features 901, 902, 903. However, in this case the overlap between IDs is small or zero. For example, the data set 931*a* has a set of IDs (each ID identifying a different data set entry) 911, 912, 913 which is disjoint from the set of IDs 914, 915, 916 of the data set 932*a*.

In contrast, in FIG. 7B Participant C 933 and Participant D 934 require respective data sets 933*a* and 934*a* with ID overlap, i.e. each data set 933*a* and 934*a* contains entries identified by the same set of IDs 911, 912, 913, 914, 915, 916. However, in this case the overlap between features is small or zero. For example, the data set 933*a* has a feature 901 which is disjoint from the set of features 902, 903 of the data set 934*a*.

In various embodiments of the present disclosure, the DAM may obtain (e.g. find, select, preprocess, deliver) the required target data, taking into consideration that the required target datasets may be preferably correlated and not independent. This may, for example, allow the DAM to meet the target data constraints on data IDs, data features, or a combination thereof.

Figure 8:
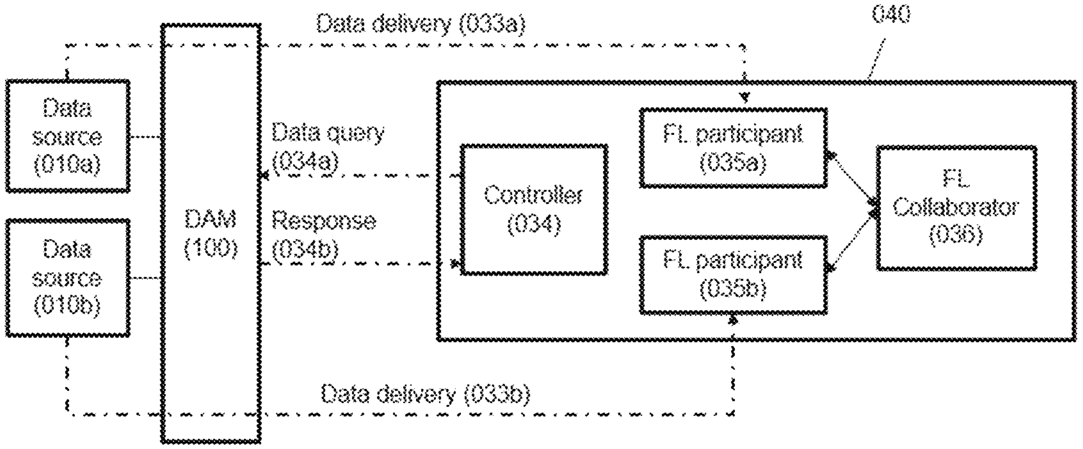
FIG. 8 illustrates a DAM interacting with a controller and an associated federated learning operation, according to embodiments of the present disclosure.

For example, referring to FIG. 8, a DAM 100 interacts with a controller 034 of an external system 040, by receiving a query 034*a* and providing a response 034*b*. The interaction may be performed as an interaction with a data consumer as described elsewhere herein. Notably, a single controller 034 interacts with the DAM on behalf of multiple parties, namely FL participants 035*a* and 035*b*. As also described elsewhere herein, the DAM 100 may cause data sources 010*a*, 010*b* to deliver 033*a*, 033*b* data (often via the DAM 100 or modules thereof, such as the DCP module) to the FL participants 035*a* and 035*b*. The FL participants 035*a* and 035*b* can, using the delivered data, participate in a federated learning exercise, involving the FL collaborator 036, as would be readily understood by a worker skilled in the art. Notably, the data delivered 033*a* by (or as coordinated by) the DAM 100 to a first FL participant 035*a* may be correlated with the data delivered 033*b* by (or as coordinated by) the DAM 100 to a second FL participant 035*b*, which facilitates the federated learning.

Figure 9:
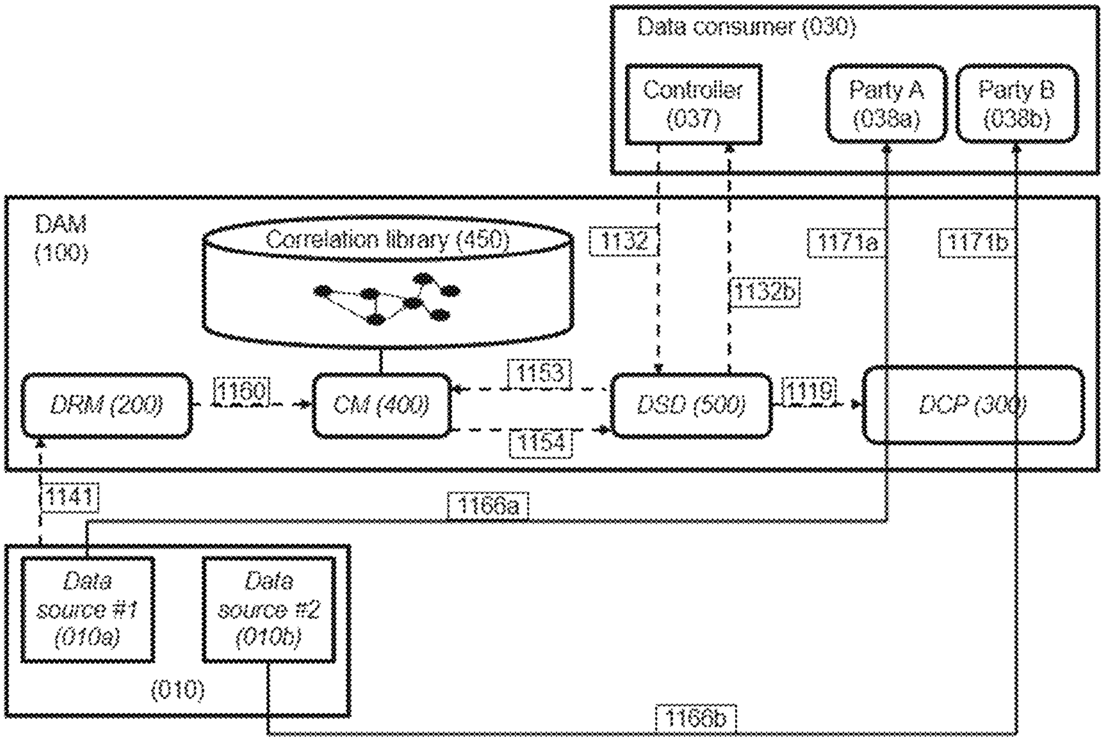
FIG. 9 illustrates an example implementation of a DAM according to embodiments of the present disclosure, in which optimum target datasets are obtained for multiple parties of the data consumer component whose required target datasets are correlated.

FIG. 9 illustrates an example implementation according to embodiments of the present disclosure, in which optimum target datasets are obtained for multiple parties of the data consumer component whose required target datasets are correlated.

Referring to FIG. 9, one or more data sources such as a first data source 010*a* and a second data source 010*b* of a set of data sources 010 each send a representation management request 1141 to request that the DRM module 200 manage the data source's data representation information. The representation management request 1141 may be similar to the registration message 241 of FIG. 2B. The message may include a data representation, and the data representation may include one or more parameters. The parameters may include information indicative of the given data source itself, information indicative of data that the given data source is capable of providing, or both, as described elsewhere herein. The DRM module 200 may select, from a representation corpus, the most useful representations for each of one or more relevant application categories.

Subsequently, the DRM module 200 sends a correlation management request 1160 to the CM module 400, to request the CM module to evaluate the correlation of representations. The correlation management request 1160 may be similar or identical to the correlation management request 260 of FIG. 2B. The correlation management request 1160 may include one or more parameters for example as described elsewhere herein with respect to the correlation management request 260. In response to the request, the data representation's correlation is detected or evaluated by the CM module 400 using content evaluation, semantic-based evaluation, or by reading pre-configuration information as described elsewhere herein. Different types of correlations (e.g. equality/inequality, similarity/dissimilarity, inclusion/exclusion dependency, or transitive correlation) can be evaluated for different applications, services, or usages. The data correlation information generated by the CM module 400 is provided as contents of the correlation library which can be generated, maintained and stored by the CM module. The original data correlation information library can be further reduced to small-scale library to facilitate subsequent efficient data discovery and selection.

The data consumer 030 sends a data discovery request 1132 to the DSD module 500 in order to discover and select suitable data for a certain use. The data discovery request 1132 may be similar or identical to the data discovery request 031 of FIGS. 4 and 5A. In the present embodiment, it is assumed that the data consumer 030 requests data for its multiple parties whose required target datasets are correlated (e.g. party A 038*a* and party B 038*b*). The data consumer 030 may use a controller 037 to send the data discovery request 1132 and receive a response. The data discovery request 1132 may include one or more parameters described below.

The one or more parameters may include an application category identifier (ID) indicative of a category that results of the data collection actions are to be used for.

The one or more parameters may include an indication of one or more features of the target data required by the multiple parties of the data consumer. Such one or more features may constitute an essential data representation (e.g. one or more data features) of the required target data. The target data required by the multiple parties of the data consumer may contain other representations in addition to such essential data representation. However, other representations cannot be known by the data consumer in advance and therefore cannot be provided to the DSD by the data consumer.

The one or more parameters may include a number of correlated datasets required by the data consumer (e.g. corresponding to the number of parties of the data consumer).

The one or more parameters may include an indication of dependencies of the target datasets required by multiple parties and indicating a required correlation between the target datasets required by multiple parties. The dependency may be indicated, for example, with AI model type (e.g. VFL model or HFL model) or a correlation type. For example, for VFL model type, the dependency is that the multiple datasets should have more data ID overlap and less data feature overlap; while for HFL model type, the dependency is that the multiple datasets should have less data ID overlap and more data feature overlap.

The one or more parameters may include an address of each device of the corresponding party of the data consumer which is designated to receive results of the set of data collection actions.

The one or more parameters may include one or more final target data requirements (e.g. data format, data structure) for results of the set of data collection actions to be transmitted to the data consumer.

The one or more parameters may include a required target dataset size indicating the amount of data required by (e.g. a specific party or multiple parties of) the data consumer.

The DSD module 500 may determine the required target data based on at least one or more of the above parameters. In various embodiments, the data consumer may provide a number of data features (maybe not all) of the target datasets needed by multiple parties (i.e. multiple FL participants) to the DSD module. For ease of explanation, the present embodiment considers that one data feature of the target datasets required by the multiple parties is provided to the DSD module. For example, if the data consumer indicates that the dependency of the target datasets is of VFL model type, then the target data selected by the DSD module for the data consumer should consist of multiple datasets, where (ideally) all the datasets have overlapped data IDs, while only one of the data features of the dataset includes the provided data feature and all other features of the datasets do not include the provided data feature. In another example, if the data consumer indicates that the dependency of the target datasets is of HFL model type, then the target data selected by the DSD module for the data consumer should consist of multiple datasets, and (ideally) none of the datasets have overlapped IDs, while all data features of the datasets include the provided data feature.

The DSD module 500 subsequently sends a correlation information request 1153 to the CM module 400. The correlation information request 1153 is to request data correlation information and may include one or more parameters for example as described elsewhere herein. The correlation information request 1153 may be similar or identical to the correlation information request 551 as described for example with respect to FIG. 5A, and the correlation information request 1151 as described for example with respect to FIG. 11.

The CM module 400 subsequently sends a correlation information response 1154 to the DSD module 500. The correlation information response 1154 may be similar or identical to the correlation information response 552 as described for example with respect to FIG. 5A, or the correlation information response 1152 as described for example with respect to FIG. 11.

The correlation information response 1154 may include (or be followed by) data correlation information as provided by the CM module in response to the correlation information request. Accordingly, the DSD module obtains correlation information from the CM module. Based on the correlation information provided by the CM module (in addition to, for example, a data requirement received, data access overhead, etc.), the DSD module may discover and select most suitable data sources which can provide (at least) the correlated data required by the multiple parties of the data consumer.

The DSD module 500 may determine the suitable data sources and data representations to fulfill the data consumer's request. The DSD module may generate a data query statement and sends the data query statement to the DCP module 300. The query statement may indicate what raw data should be collected from which data sources. For example, the DSD module may select the data sources that can provide datasets with more data ID overlap and less data feature overlap for VFL model type; while the DSD module may select the data sources with less data ID overlap and more data feature overlap for VFL model type.

Figure 10:
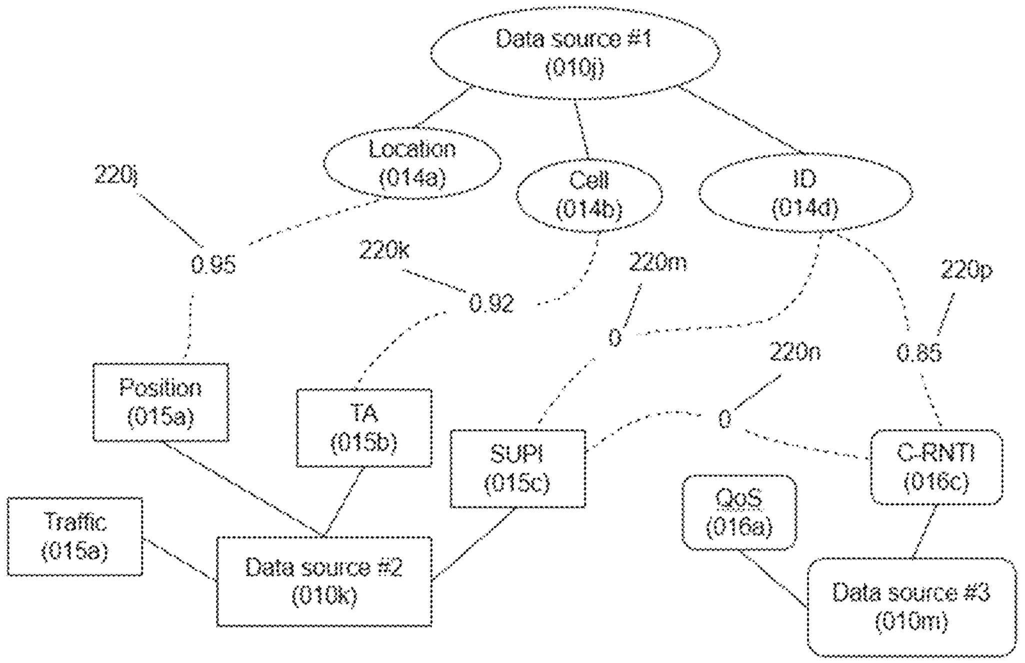
FIG. 10 illustrates data sources and data representations, according to other embodiments of the present disclosure.

As illustrated in FIG. 10, if there are two FL participants (parties) (not shown) and the essential data feature indicated by the data consumer is Location 014*a*, then the DSD module may select the Data source #1 010*j* and the Data source #3 010*m* for VFL, because the Data source #1 010*j* and the Data source #3 010*m* have datasets with more correlated data ID representations, such as ID 014*d* of Data source #1 010*j* and C-RNTI 016*c* (a type of ID) of Data source #3 010*m* which have a correlation level of 0.85 220*p*, and no correlated data feature representations. Similarly, the DSD module may select the Data source #1 010*j* and the Data source #2 010*k* for HFL, because the Data source #1 010*j* and the Data source #2 010*k* have datasets with fewer correlated data ID representations, the only one being ID 014*d* of Data source #1 010*j* and SUPI 015*c* (a type of ID) of Data source #2 010*k* which have a correlation level of 0 (zero) 220*m*, while having more correlated data feature representations, such as Location 014*a* of Data source #1 010*j* and Position 015*a* of Data source #2 010*k* which have a correlation level of 0.95 220*j*, and such as Cell 014*b* of Data source #1 010*j* and TA 015*b* of Data source #2 010*k* which have a correlation level of 0.92 220*k*.

As further illustrated in FIG. 9, the DSD module 500 sends a data collection and preprocessing request 1119 to the DCP module 300 (e.g. the DCP controller thereof) to activate a DCP point device (i.e. instance) to collect data for the multiple parties. As an example, in this step of the present embodiment, it is assumed that the raw data can be used directly by the data consumer (multiple parties thereof) without preprocessing, however in other examples preprocessing may be needed and may include at least the features of preprocessing as described elsewhere herein. Before sending the data collection and preprocessing request 1119 to the DCP module, the DSD module may perform a DCP (e.g. module point, device, instance, anchor) selection, as described elsewhere herein. The data collection and preprocessing request 1119 may include one or more parameters as described below. When the DCP module does not perform preprocessing, it may be referred to as a data collection and delivery (DCD) module.

The parameters of the data collection and preprocessing request 1119 may include an indication information indicating that raw data can be used directly by the (e.g. multiple parties of) the data consumer and preprocessing is not needed.

The parameters of the data collection and preprocessing request 1119 may include a data query statement including data to be collected and the corresponding suitable data sources (i.e. to indicate what raw data should be collect from which data sources), including one or more of the following parameters: a data representation (e.g. data feature, data ID); a data source address, a data size. The format of such data query statement may be, for example: [(representation #1, data source #A, data size #C); (representation #2, data source #B, data size #D); . . . ].

The parameters of the data collection and preprocessing request 1119 may include corresponding addresses of the multiple parties of the data consumer to receive target data.

The parameters of the data collection and preprocessing request 1119 may include mapping between the data sources and addresses of multiple parties of the data consumer indicating that which collected data from a specific data source should be delivered to which party of the data consumer.

Subsequently and referring back to FIG. 9, the DSD module 500 sends a data discovery response 1132*b* to the data consumer 030 (e.g. controller 037 thereof) to notify the data consumer of successful data discovery and collection. The data discovery response 1132*b* may include one or more parameters, for example indicative of one or more of: application category identifier; data representations; and data size.

The DCP module 300 may set up secure tunnels to collect and deliver data from data source and to data consumers. The DCP module collects data from data sources and delivers them to each party of data consumer via the secure tunnels respectively. The DCP module may, in various embodiments, only collect data related to the data representations indicated by the DSD module in the data collection and preprocessing request 1119.

The DCP module 300 may establish and configure secure tunnels to collect 1166*a*, 1166*b* and deliver 1171*a*, 1171*b* data from the first data source 010*a* and the second data source 010*b* to the party A 038*a* and party B 038*b*, respectively, of the data consumer 030. The DCP module 300 collects data indexed by the representations received in association with the data collection and preprocessing request 1119 from data sources and (if needed) preprocesses the collected raw data based on the preprocessing rules which may also be received in association with the data collection and preprocessing request 1119 or the preprocessing rules that may be constructed by the DCP module 300 itself, as described elsewhere herein.

Subsequently, the DCP module delivers 1171*a*, 1171*b* data from the first data source 010*a* and the second data source 010*b* to the party A 038*a* and party B 038*b*, respectively, of the data consumer 030 via the secure tunnels.

In various embodiments of the present disclosure, the above-described embodiment can be used to help multiple parties of a data consumer to discover and select suitable data when the multiple parties require correlated datasets, based on the maintained knowledge (i.e. data source representation and correlation) of the data sources, and limited indication information (e.g. a few of data feature, data dependency type) received from the data consumer.

Figure 11:
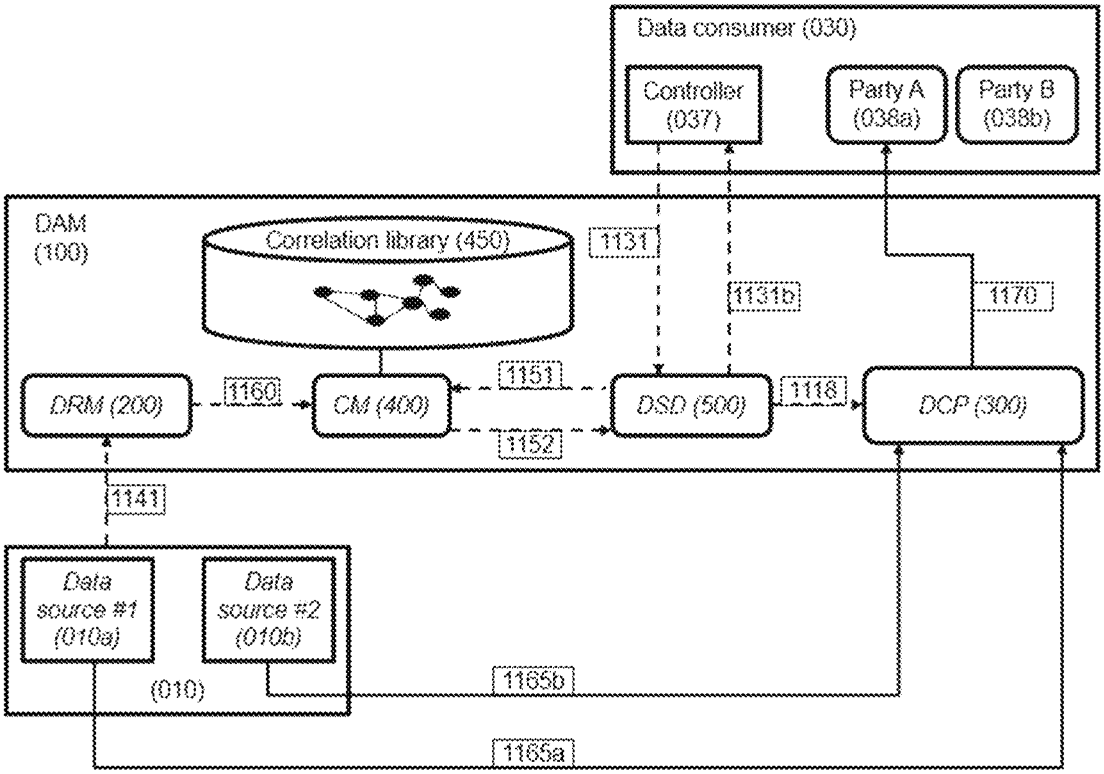
FIG. 11 illustrates an example implementation of a DAM according to embodiments of the present disclosure, in which data collection and data synthesis are performed.

FIG. 11 illustrates an example implementation according to embodiments of the present disclosure, in which data collection and data synthesis are performed. For this embodiment, it is assumed that the raw data as provided by the data sources cannot be used directly by the data consumer, and thus data preprocessing is performed. For example, a data consumer may require a composite dataset which is not available from any single data source, in which case the DAM may stitch or merge the required data together based on information from multiple data sources. Accordingly, the DAM collects raw data from data sources, preprocesses the raw data, and then delivers the preprocessed data to data consumer.

Referring to FIG. 11, one or more data sources such as 010*a* 010*b* of a set 010 each send a representation management request 1141 which may include a request that the DRM module 200 manage the data source's data representation information, and the DRM module receives same. The representation management request 1141 may be similar to the registration message 241 of FIG. 2B. The message may include a data representation, and the data representation may include one or more parameters. The parameters may include information indicative of the data source itself, information indicative of data that the data source is capable of providing, or both, as described elsewhere herein. The DRM module 200 may select, from the representation corpus, the most useful representations for each of one or more relevant application categories.

Subsequently, the DRM module 200 sends a Correlation management request 1160 to the CM module 400, to request the CM module to evaluate the correlation of representations. The correlation management request 1160 may be similar or identical to the correlation management request 260 of FIG. 2B. The correlation management request 1160 may include one or more parameters for example as described elsewhere herein with respect to the correlation management request 260. In response to the request, the data representation's correlation is detected or evaluated by the CM module 400 using content evaluation, semantic-based evaluation, or by reading pre-configuration information as described elsewhere herein. Different types of correlations (e.g. equality/inequality, similarity/dissimilarity, inclusion/exclusion dependency, or transitive correlation) can be evaluated for different applications, services, or usages. The data correlation information generated by the CM module 400 is provided as contents of the correlation library which can be maintained and stored by the CM module. The CM module may generate and store the contents to the correlation library. The original data correlation information library can be further reduced to small-scale library to facilitate subsequent efficient data discovery and selection.

The data consumer 030 sends a data discovery request 1131 to the DSD module 500 in order to discover and select suitable data for a certain use. The data discovery request 1131 may be similar or identical to the data discovery request 031 of FIGS. 4 and 5A. In the present embodiment, for the sake of clarity, it is assumed that the data consumer 030 requests data for one party (e.g. party A 038*a*). However, in other embodiments, data can be requested for multiple parties, e.g. also including party B 038*b*. The data consumer 030 may use a controller 037 to send the data discovery request 1131 and receive a response.

The data discovery request 1131 may include one or more parameters for example as described elsewhere with respect to FIGS. 4 and 5A. For example, parameters of the data discovery request 1131 may include an application category identifier, an essential data representation, addresses of parties of the data consumer (e.g. address of party A 038*a*) to which data is to be sent, final target data requirements, and a required data size indicating an amount of data to be provided.

As an example, suppose party A 038*a* is Participant A 931 in the horizontal federated learning (HFL) scheme of FIG. 8A. In this case, the parameters indicating the essential data representation may indicate that data feature 1 901, data feature 2 902 and data feature 3 903 are the data required by the party A 038*a*.

The DSD module 500 is configured to determine the final target data based at least in part on the provided application ID and essential data representation parameters in the data discovery request 1131.

The DSD module 500 subsequently sends a correlation information request 1151 to the CM module 400. The correlation information request 1151 is to request data correlation information and may include one or more parameters for example as described elsewhere herein. The correlation information request 1151 may be similar or identical to the correlation information request 551 as described for example with respect to FIG. 5A.

The CM module 400 subsequently sends a correlation information response 1152 to the DSD module 500. The correlation information response 1152 may be similar or identical to the correlation information response 552 as described for example with respect to FIG. 5A. The correlation information response 1152 may include (or be followed by) data correlation information as provided by the CM module in response to the correlation information request. Accordingly, the DSD module obtains correlation information from the CM module.

Based on information such as the correlation information, data requirements received in association with the data discovery request 1131, data access overhead, etc., the CM module 400 discovers and selects the most suitable data sources which can provide the data required by the data consumer. The DSD module determines the involved data sources and data representations to be used to fulfill the data consumer's request. The DSD module then generates a data query statement and subsequently sends the data query statement to the DCP module. The query statement indicates the raw data to be collect and the data sources from which this raw data is to be collected. For example, referring to FIG. 6A, the DSD module may discover a first data source (providing data 010*e*) and a second data source (providing data 010*f*) which can provide the required target data 523. Neither of data 010*e* or data 010*f* on its own provide all of the required target data 523. That is, none of the data sources own the directly usable dataset which should have the whole features of data feature 1, feature 2 and feature 3. Furthermore, the data IDs of the two data sets 010*e* and 010*f* are not aligned. Therefore, in embodiments, the DAM will preprocess the raw data 010*e* and 010*f* into the required target data 523. This may involve merging (joining) together some parts of data entries and deleting other parts of data. This preprocessing forms a composite data set which is the data required by the data consumer or a party thereof. The DSD module may construct the data preprocessing rules, for execution by the DCP module, which modify non-directly useable to form the required target data. This may include merging data together, filtering the irrelevant or redundant data, or a combination thereof.

Referring back to FIG. 11, the DSD module 500 subsequently sends a data collection and preprocessing request 1118 to the DCP module 300, for example to a DCP controller thereof. The data collection and preprocessing request 1118 may be similar or identical to the data collection and preprocessing request 518 as described with respect to FIG. 5B. The data collection and preprocessing request 1118 may activate a selected DCP module instance to collect data and, if required, to preprocess the collected data. Before or concurrently with sending the data collection and preprocessing request 1118, the DCP module 500 may select the DCP module instance which is to perform data collection and preprocessing (where required).

The data collection and preprocessing request 1118 may include one or more parameters for example as described with respect to FIG. 5B.

As an example with respect to FIG. 6A, parameters of a data query statement, as indicated in the data collection and preprocessing request 1118 can be in the format of [(feature #1 and feature #2, data source #1); (feature #2 and feature #3, data source #2); . . . ]. This indicates an instruction to collect data indexed by feature #1 and feature #2 from data source #1; and collect data indexed by feature #2 and feature #3 from data source #2; etc.

As an example, parameters of a data preprocessing rule, as indicated in the data collection and preprocessing request 1118, can be indicative that data is to be preprocessed in a certain manner. This manner can indicate preprocessing operations, representations (to index the data which is to be preprocessed) and conditions (e.g. step sequence, timestamp, trigger event) to execute preprocessing operation. This may indicate that the data preprocessing operation are to be executed by the DCP module when the specified conditions are met.

As an example, with respect to FIG. 6A, the preprocessing rule may be:

a. Operation 1 (or indicated with trigger event, or timestamp): Stitch together the data provided by both the first data source and the second data source;
b. Operation 2 (or indicated with trigger event, or timestamp): Filter (discard) the data having IDs (e.g. ID4 544, ID5 545, ID6 546) which do not appear in both data sets 010*e*, 010*f*;

c. Operation 3 (or indicated with trigger event, or timestamp): Retain one copy of redundant data (e.g. data 547*b*) and other copies;

d. Operation 4 (or indicated with trigger event, or timestamp): Clean or transcribe the data to the required data format;

As another example, with respect to FIG. 6B, data source #2 010*h* can provide data 015*a* on network traffic, data source #3 010*i* can provide data 016*a* on network QoS, and the final target data needed by a data consumer may be the data on network traffic and QoS. Furthermore, the data 015*a* on network traffic provided by data source #2 010*h* and the data 016*a* on network QoS provided by data source #3 010*i* are joinable via the correlated data provided by data source #1. Therefore, to generate the final target data, the preprocessing rule can be: stitch (merge) together the data from data source #1, data source #2 and data source #3, where the representations (QoS 016*a* and traffic 015*a*) are to be stitched, the correlated intermediate representations (time 016*b*, timestamp 014*c*, location 014*a*, position 015*b*) are used to stitch the data, the intermediate data sources (data source #1 010*g*) are used to determine correlated intermediate representations, and start and end data sources (traffic 015*a* of data source #3 010*h* and QoS 016*a* data source #3 010*i*) can thus be connected as a result of stitching using correlations, as shown by the line 525 connecting the target traffic 015*a* and QoS 016*a* in FIG. 6B.

Subsequently and referring to FIG. 11, the DSD module 500 sends a data discovery response 1131*b* to the data consumer 030 to notify the data consumer of successful data discovery and collection. The data discovery response 1131*b* may include one or more parameters, for example indicative of application category identifier, data representations, and data size.

The DCP module 300 may establish and configure secure tunnels to collect 1165*a*, 1165*b* and deliver 1170 data from data sources 010*a*, 010*b* to the party A 038*a* of the data consumer 030. The DCP module 300 collects data indexed by the representations received in association with the data collection and preprocessing request 1118 from data sources and preprocesses the collected raw based on the preprocessing rules also received in association with the data collection and preprocessing request 1118 or the preprocessing rules constructed by the DCP module 300 itself.

Subsequently, the DCP module delivers 1170 the final target data to party A 038 of the data consumer 030 via the secure tunnels.

Accordingly, although the data provided by the data sources may not necessarily be directly useable by a data consumer, embodiments of the present disclosure may preprocess the data so that it becomes usable. The DAM determines the data sources to collect data from and the data representations to provide. The DAM (e.g. interactively or autonomously) assists the data consumer in generating a data query statement including the data to be collected and related data sources, to indicate the raw data to be collect and the data sources to collect the raw data from. Moreover, the DAM may determine and implement data preprocessing rules to transform the non-directly usable data into usable data. This approach may reduce the data consumer's data processing overhead, and may facilitate better utilization of raw data to improve data potential. The proposed DAM platform may be used to provide a facility or business model for companies or networks selling datasets. The cost of provided datasets may be levied on a per-access (only the useful data items is exposed and accessed) instead of selling an entire dataset.

Figure 12:
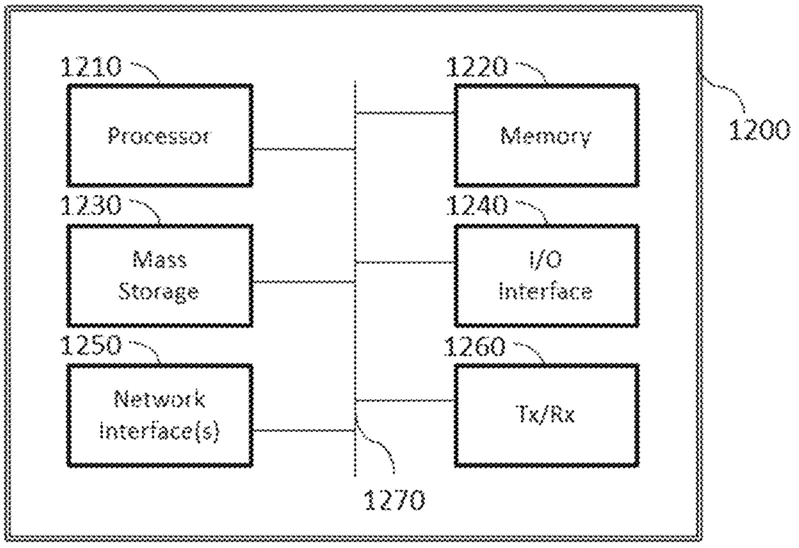
FIG. 12 is a schematic diagram of an electronic device, according to embodiments of the present disclosure.

FIG. 12 is a schematic diagram of an electronic device 1200 that may perform any or all of the steps of the above methods and features described herein, according to different embodiments of the present disclosure. For example, physical machines or servers, or other computing devices can be configured as the electronic device. The electronic device may be a single integrated device or a device formed from separate but networked components for example in a data center, collection of data centers or other facility. An apparatus configured to perform embodiments of the present disclosure can include one or more electronic devices for example as described in FIG. 12, or portions thereof.

As shown, the device 1200 includes a processor 1210, such as a Central Processing Unit (CPU) or specialized processors such as a Graphics Processing Unit (GPU) or other such processor unit, memory 1220, non-transitory mass storage 1230, I/O interface 1240, network interface 1250, and a transceiver 1260, all of which are communicatively coupled via bi-directional bus 1270. According to certain embodiments, any or all of the depicted elements may be utilized, or only a subset of the elements. Further, the device 1200 may contain multiple instances of certain elements, such as multiple processors, memories, or transceivers. Also, elements of the hardware device may be directly coupled to other elements without the bi-directional bus.

The memory 1220 may include any type of non-transitory memory such as static random access memory (SRAM), dynamic random access memory (DRAM), synchronous DRAM (SDRAM), read-only memory (ROM), any combination of such, or the like. The mass storage element 1230 may include any type of non-transitory storage device, such as a solid state drive, hard disk drive, a magnetic disk drive, an optical disk drive, USB drive, or any computer program product configured to store data and machine executable program code. According to certain embodiments, the memory 1220 or mass storage 1230 may have recorded thereon statements and instructions executable by the processor 1210 for performing any of the aforementioned method steps described above.

An electronic device configured in accordance with the present disclosure may comprise hardware, software, firmware, or a combination thereof. Examples of hardware are computer processors, signal processors, ASICs, FPGAs, silicon photonic chips, etc. The hardware can be electronic hardware, photonic hardware, or a combination thereof. The electronic device can be considered a computer in the sense that it performs operations that correspond to computations, e.g. receiving and processing data, receiving and processing instructions, generating and storing data, providing outputs such as instructions, queries, or reports, or the like, or a combination thereof. The electronic device can thus be provided using a variety of technologies as would be readily understood by a worker skilled in the art. The electronics device can include a computer operatively coupled to memory, such as non-transitory electronic memory. The memory may hold computer program instructions which, when executed, cause the computer to perform operations as described herein.

It will be appreciated that, although specific embodiments of the technology have been described herein for purposes of illustration, various modifications may be made without departing from the scope of the technology. The specification and drawings are, accordingly, to be regarded simply as an illustration of the disclosure as defined by the appended claims, and are contemplated to cover any and all modifications, variations, combinations or equivalents that fall within the scope of the present disclosure. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device. The computer-readable medium may be non-transitory in the sense that the information is not contained in transitory, propagating signals.

Acts associated with the method described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each step of the method may be executed on any computing device, such as a personal computer, server, or the like and pursuant to one or more, or a part of one or more, program elements, modules or objects generated from any programming language, such as C++, Java, or the like. In addition, each step, or a file or object or the like implementing each said step, may be executed by special purpose hardware or a circuit module designed for that purpose.

Through the descriptions of the preceding embodiments, the present disclosure may be implemented by using hardware only or by using software and a necessary universal hardware platform. Based on such understandings, the technical solution of the present disclosure may be embodied in the form of a software product.

It will be readily understood that, throughout the preceding discussion, the above-described network functionalities and operations may correspond to a method for use in supporting operation of a communication network, such as a 5G or 6G wireless communication network. The method may involve computer-implemented functions, namely functions which are implemented by one or more computing, communication or memory components of the network infrastructure, or a combination thereof. These components may take various forms, such as specific servers or general-purpose computing, communication or memory devices, or combinations thereof, which are configured to provide the required functionality through virtualization technologies. The method may involve the operation of one or more network components in order to improve the operation of the network. As such, with the communication network viewed as an apparatus, embodiments of the present disclosure may be directed to improving internal operations of the communication network.

Further, it will be readily understood that embodiments of the present disclosure relate to a communication network system or associated apparatus thereof, which is configured to perform the above-described network functionalities and operations. Again, the system or apparatus may comprise one or more computing, communication or memory components of the network infrastructure, or combinations thereof, which may take various forms, such as specific servers or general-purpose computing, communication or memory devices, or combinations thereof, which are configured to provide the required functionality through virtualization technologies. Various methods as disclosed herein may be implemented on one or more real or virtual computing devices, such as devices within a communication network control plane, devices operating in the data plane, or a combination thereof. Computing devices used to implement method operations may include a processor operatively coupled to memory, the memory providing instructions for execution by the processor to perform the method as described herein.

Various embodiments of the present disclosure utilize one or both of: real computer resources; and virtual computer resources. Such computer resources utilize, at a hardware level, a set of one or more microprocessors operatively coupled to a corresponding set of memory components which include stored program instructions for execution by the microprocessors. Computing resources may be used to provide virtual computing resources at one or more levels of virtualization. For example, one or more given generic computer hardware platforms may be used to provide one or more virtual computing machines. Computer hardware, such as processor resources, memory, and the like, may also be virtualized in order to provide resources from which further virtual computing machines are built. A set of computing resources which are allocatable for providing various computing resources which in turn are used to realize various computing components of a system, may be regarded as providing a distributed computing system, the internal architecture of which may be configured in various ways.

In the above, it should be noted that functions and modules may be given different names and instantiated in different ways. A given function may be merged or integrated with one or more other functions. A given function may be provided by cooperation of multiple separate functional elements.

Although the present disclosure has been described with reference to specific features and embodiments thereof, it is evident that various modifications and combinations can be made thereto without departing from the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

The invention claimed is:

1. A networked computerized system comprising at least one processor and at least one non-transitory computer-readable medium storing instructions that, when executed by the at least one processor, cause the at least one processor to implement:

- a data representation manager (DRM) module configured to obtain at least one representation of one or more data sources, each representation corresponding to a data source of said one or more data sources, the representation including machine-readable metadata describing a characteristic of said data source;
- a data collection and preprocessing (DCP) module configured to interact with members of the one or more data sources to obtain data from the one of more data sources in accordance with a set of data collection actions;

a correlation manager (CM) module configured to determine at least one correlation between different data of said one or more data sources, said at least one correlation being computed using the machine-readable metadata of said at least one representation; and a data source discovery (DSD) module configured to:

interact with a data consumer component and the CM module to determine, based in part on the at least one correlation, the set of data collection actions to be performed, the set of data collection actions being configured to support a request from the data consumer and identify one or more data sources from which data is to be collected; and configure the DCP module to perform the set of data collection actions by transmitting configuration information identifying the set of data collection actions to the DCP module.

2. The system of claim 1, wherein the set of data collection actions comprises:

collecting raw data from the one or more data sources; or collecting raw data from the one or more data sources and preprocessing the collected raw data.

3. The system of claim 1, wherein, said at least one representation comprises one or more of:

information indicative of said data source; and information indicative of data that said data source is configured to provide.

4. The system of claim 1, wherein the DRM module is configured to generate said at least one representation in part by: requesting a report from said data source; and receiving and processing the report to obtain the at least one representation.

5. The system of claim 4, wherein requesting the report comprises transmitting representation configuration information to said data source, said representation configuration Information indicating a representation of data to be provided by said data source to the DRM module.

6. The system of claim 1, wherein said at least one correlation between different data of said one or more data sources is an indication of coherence between two or more members of said different data, and wherein said coherence reflects one or more of: a degree of equality or inequality; a degree of similarity or dissimilarity; a degree of inclusion dependency or exclusion dependency; and a degree of transitive correlation.

7. The system of claim 1, wherein the DRM module is configured to interact with the CM module to initiate the CM module to perform said determining at least one correlation between said different data of said one or more data sources, and wherein said interacting with the CM module comprises the DRM module sending an evaluation request to the CM module and wherein the evaluation request comprises one or more of:

one or more of said at least one representation;

a correlation type to be used in said determining at least one correlation;

an indication that the CM module is to evaluate correlation information for the one or more of said at least one representation;

an indication that the CM module is to perform said determining at least one correlation based on the correlation type;

an application category identifier indicative of an application category of said at least one representation, or indicative that the CM module is to determine at least one correlation between said at least one representation and the application category, or a combination of said at least one representation and the application category;

a data source identifier identifying one or more members of the one or more data sources which are providing an associated one or more of said at least one representation; and one or more computer memory addresses holding raw data of one or more of said at least one representation.

8. The system of claim 1, wherein said interacting with the data consumer component comprises:

generating a query plan indicative of data to be collected and members of the one or more data sources from which said data is to be collected.

9. The system of claim 1, wherein said configuring the DCP module to perform the set of data collection actions comprises selecting, based on the set of data collection actions, one or more of a plurality of DCP module instances, and configuring said selected one or more of the plurality of DCP module instances.

10. The system of claim 1, wherein said interacting with the data consumer component comprises receiving and processing contents of the request from the data consumer component, said contents comprising parameters indicative of one or more of:

an application category identifier indicative of a category that results of the data collection actions are to be used for;

an indication of one or more features of data required by the data consumer;

a number of correlated datasets required by the data consumer;

an indication of dependencies of datasets required by multiple parties and indicating a required correlation between the datasets required by multiple parties;

an address of a device of the data consumer which is designated to receive results of the set of data collection actions; and one or more final target data requirements for results of the set of data collection actions to be transmitted to the data consumer.

11. The system of claim 10, said configuring the DCP module to perform the set of data collection actions comprises: configuring the DCP module to perform the set of data collection actions based in part on said parameters.

12. The system of claim 1, wherein the DCP module comprises a DCP controller and a plurality of DCP point devices, the DCP point devices responsive to configuration instructions by the DCP controller, the configuration instructions causing the DCP point devices to collectively perform the set of data collection actions.

13. The system of claim 12, wherein the DCP controller is deployed in a control plane of a network, and the DCP point devices are deployed in a user plane or a data plane of the network.

14. The system of claim 12, wherein one of the DCP point devices is configured, due to said configuring of the DCP module, to operate as an anchor device operative to provide results of said set of data collection actions to one or more devices of the data consumer.

15. The system of claim 12, wherein the DCP controller is configured to perform one or more of:

determining one or more rules for preprocessing said obtained data;

selecting ones of the DCP point devices to perform the set of data collection actions;

configuring and activating ones of the DCP point devices; and determining resource scheduling for performing the set of data collection actions.

16. The system of claim 12, wherein the DCP controller is configured to send, to at least one of the DCP point devices, a data collection and preprocessing requirement message, the data collection and preprocessing requirement message causing said at least one of the DCP point devices to perform one or more data collection tasks, data preprocessing tasks, or both, said tasks configured based on contents of the data collection and preprocessing requirement message, and wherein parameters of the data collection and preprocessing and requirement message comprise one or more of:

an identifier of one of the DCP point devices to be configured and activated;

an indication of whether or not data preprocessing is required;

a data query statement indicating types of raw data to be collected from specified ones of the set of networked data sources;

an address of a device to which said at least one of the DCP point devices is to forward output toward;

a requirement on final target data to be transmitted to the data consumer; and a data preprocessing rule indicating how collected raw data is to be preprocessed.

17. The system of claim 1, wherein the DCP module comprises one or more devices each configured to provide an indication of capabilities of the one or more devices to the DSD module, the DSD module performing said configuring the DCP module based in part on said indication of capabilities.

18. The system of claim 1, wherein said configuring the DCP module to perform the set of data collection actions comprises the DSD module providing the DCP module with one or more configuration parameters including one or more of:

an identifier of a DCP point device to be configured and activated;

an indication of whether preprocessing on said obtained data is to be performed;

an indication of raw data to be collected from specified members of the set of networked data sources;

an address of a device to which the DCP module is to forward output toward;

an indication of a requirement on final target data to be transmitted to the data consumer;

an indication of one or more rules to be applied by said preprocessing on said obtained data; and an indication of one or more data correlations between different involved ones of said representation of data sources, said indication being used in said preprocessing on said obtained data.

19. The system of claim 18, wherein said indication of one or more rules to be applied by said preprocessing on said obtained data is indicative of one or more of:

one or more rules to be used for merging said obtained data;

one or more rules to be used for filtering said obtained data;

one or more rules to be used for cleaning said obtained data, normalizing said obtained data, or both;

one or more indications of portions of said obtained data to which associated ones of the one or more rules are to be applied; and one or more conditions triggering implementation of associated ones of the one or more rules.

20. A computer-implemented method performed by a networked computerized system comprising at least one processor and at least one non-transitory computer-readable medium storing instructions for execution by the at least one processor, the method comprising:

by a data representation manager (DRM) module, obtaining at least one representation of one or more data sources, each representation corresponding to a data source of said one or more data sources, the representation including machine-readable metadata describing a characteristic of said data source;

by a data collection and preprocessing (DCP) module, interacting with members of the one or more data sources to obtain data from the one or more data sources in accordance with a set of data collection actions;

by a correlation manager (CM) module, determining at least one correlation between different data of said one or more data sources, said at least one correlation being computed using the machine-readable metadata of said at least one representation; and by a data source discovery (DSD) module:

interacting with a data consumer component and the CM module to determine, based in part on the at least one correlation, the set of data collection actions to be performed, the set of data collection actions being configured to support a request from the data consumer and identify one or more data sources from which data is to be collected; and configuring the DCP module to perform the set of data collection actions by transmitting configuration information identifying the set of data collection actions to the DCP module.

* * * * *